Patented June 5, 1934

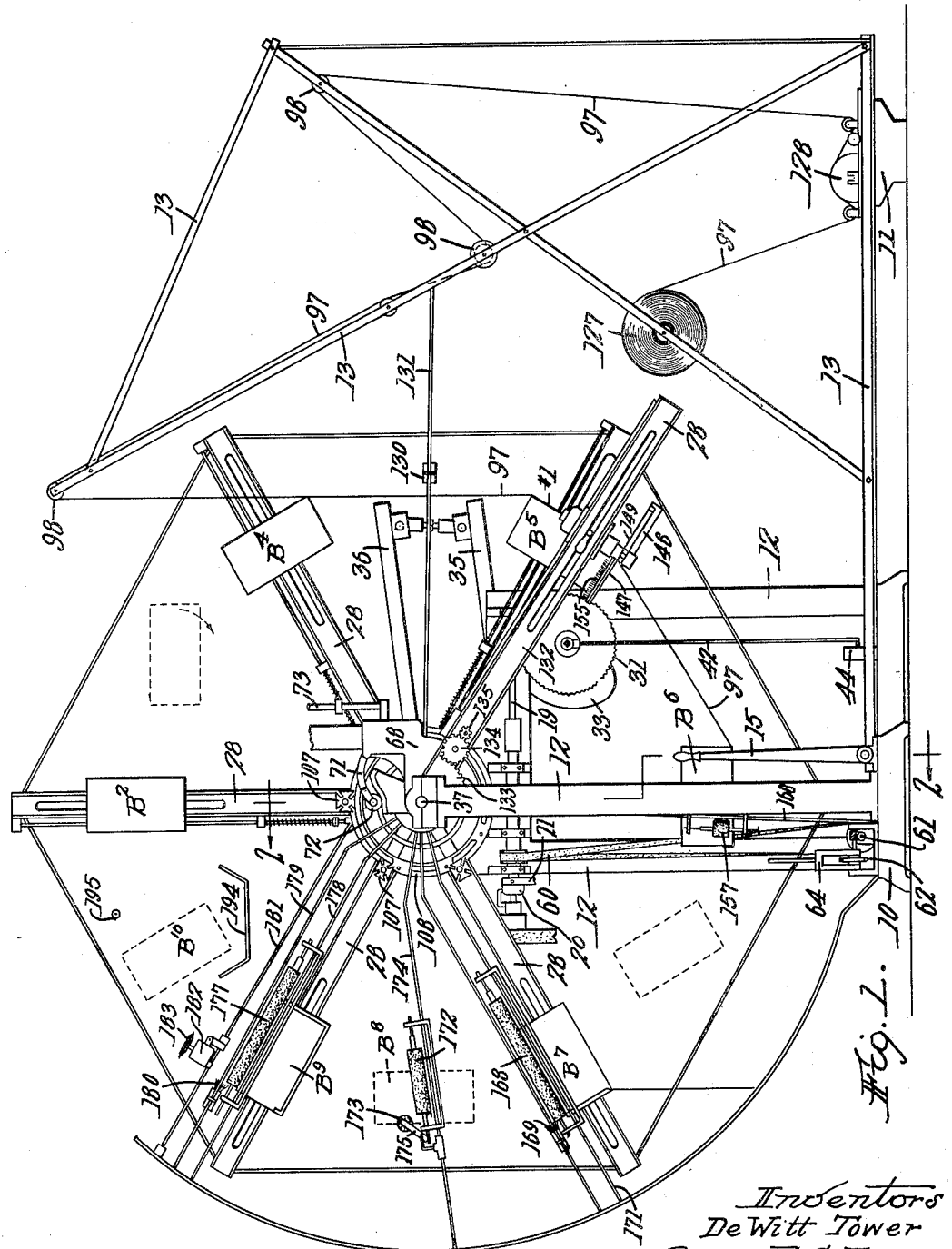

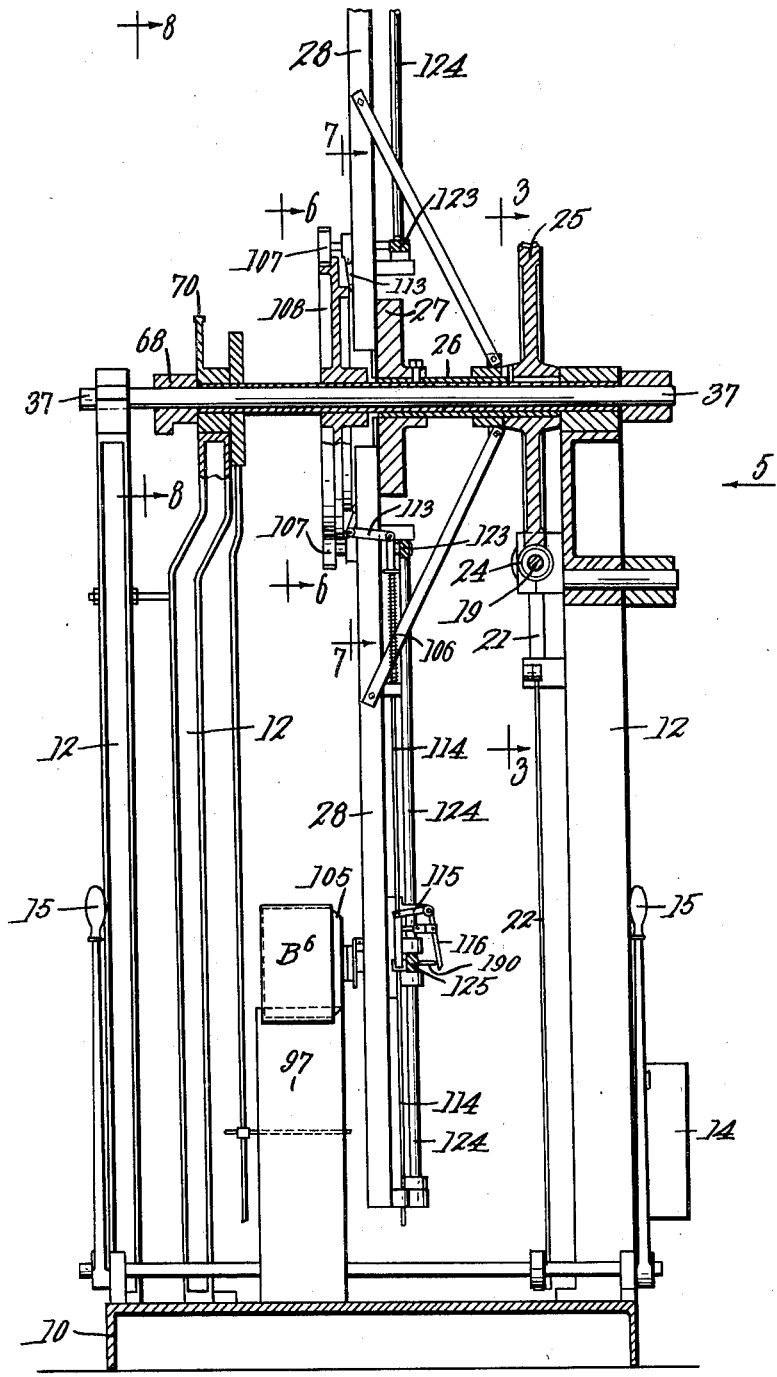

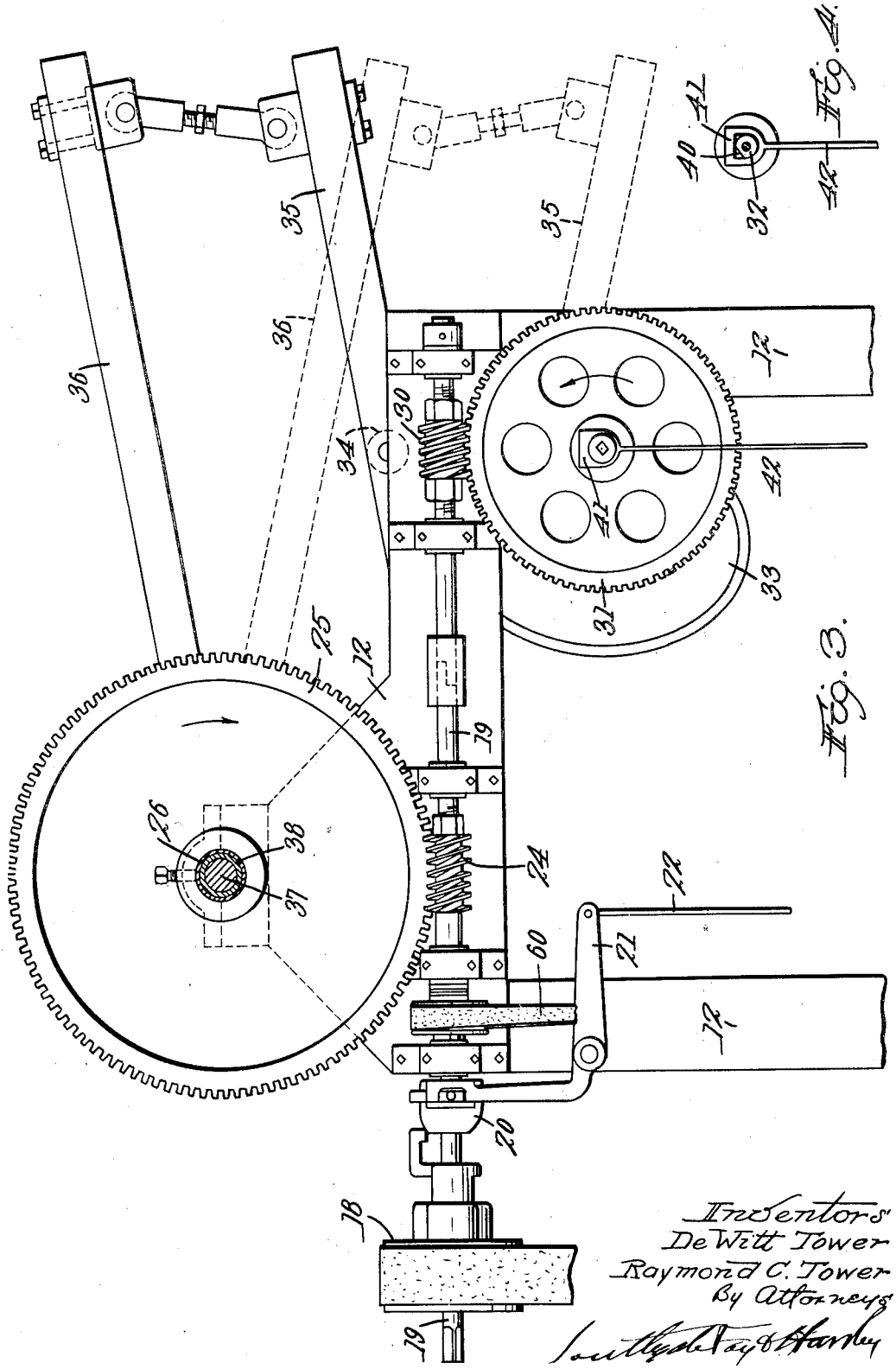

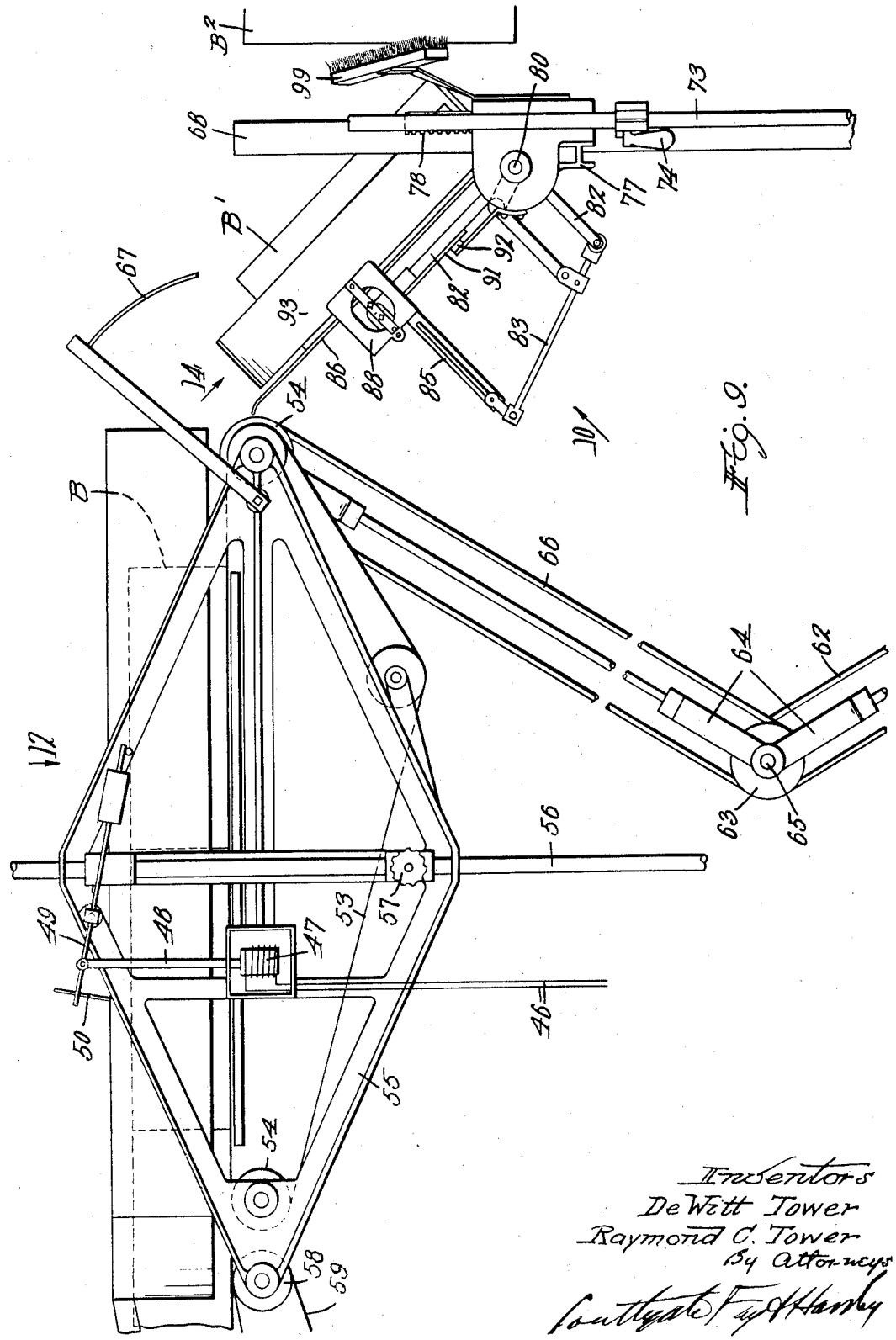

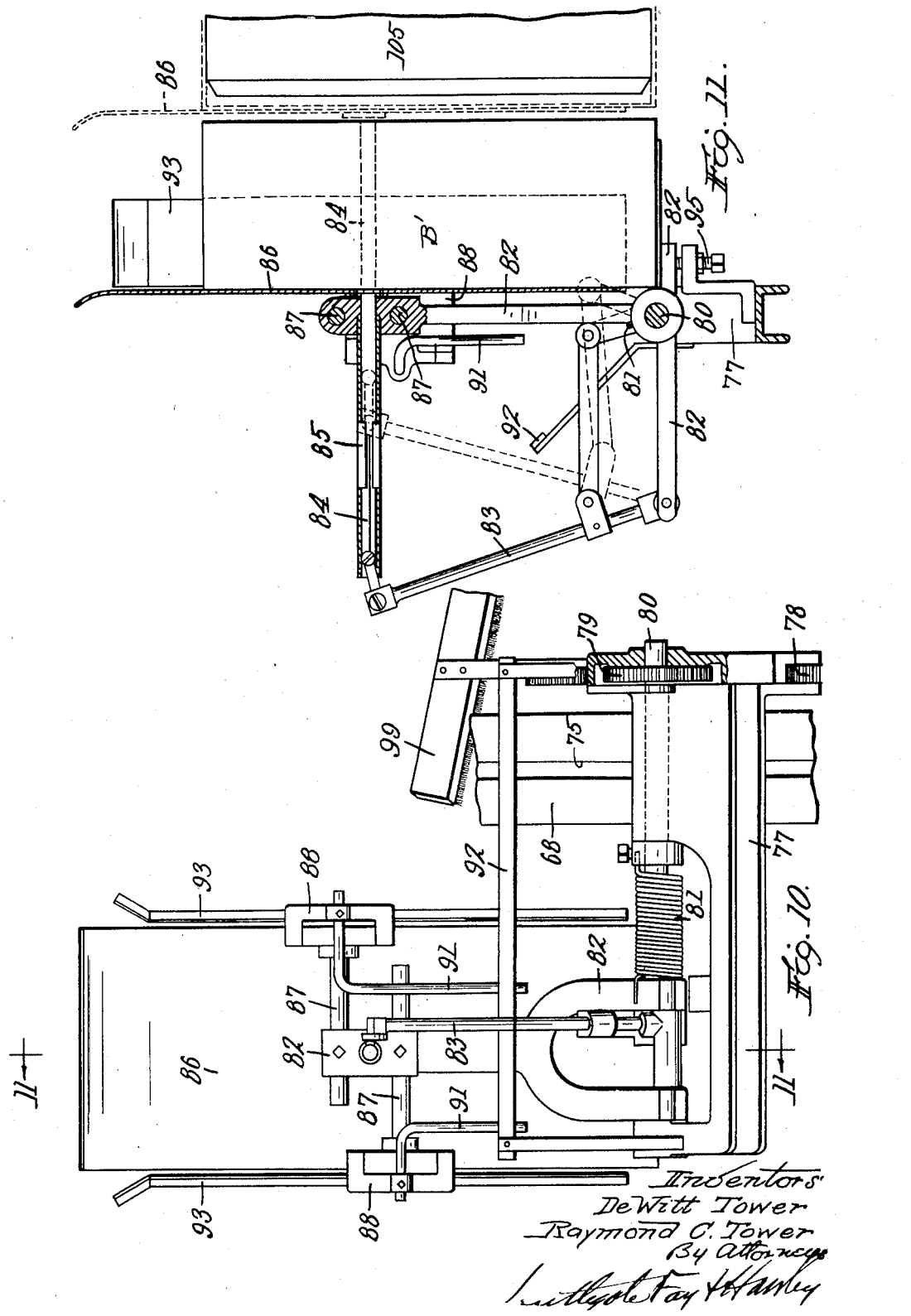

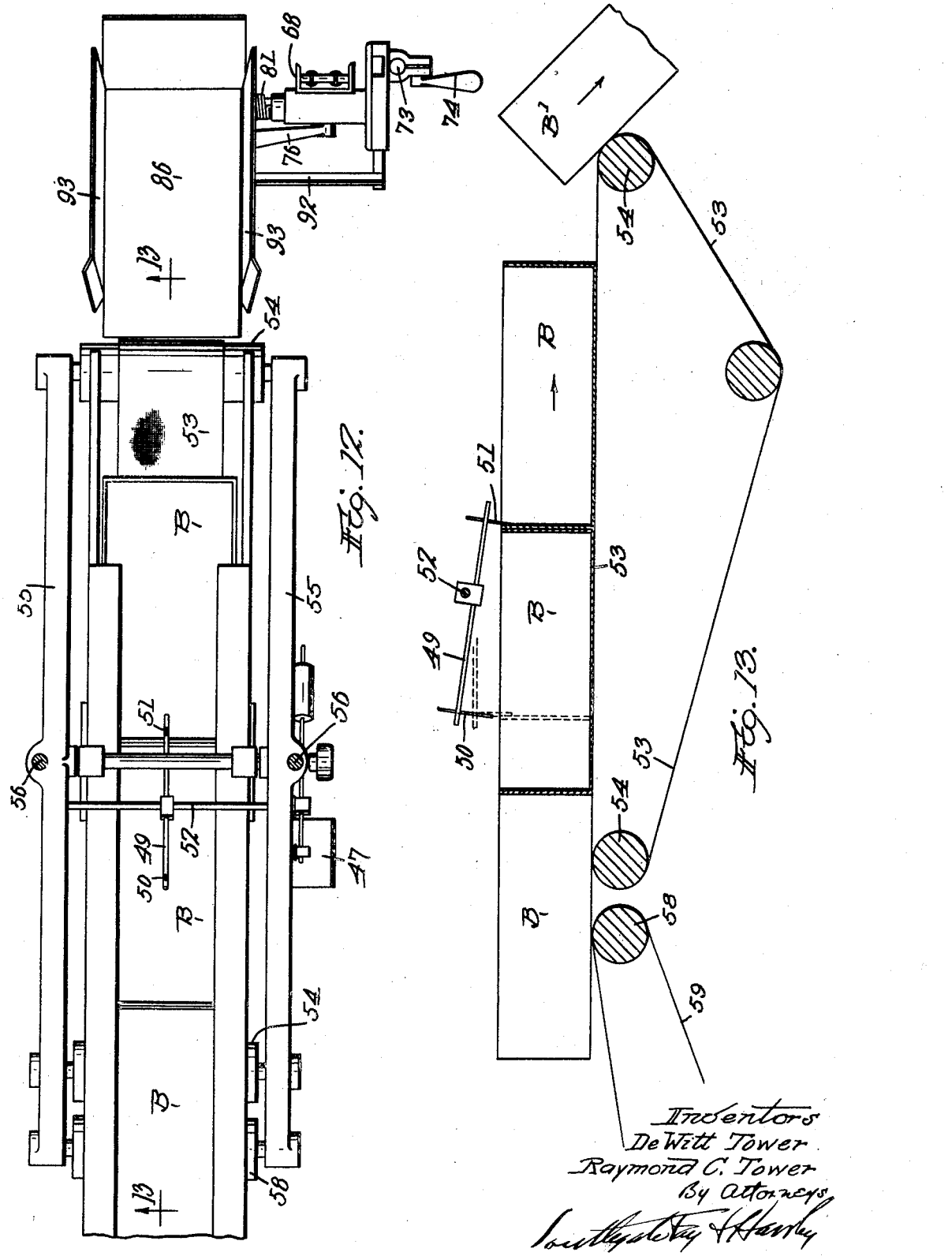

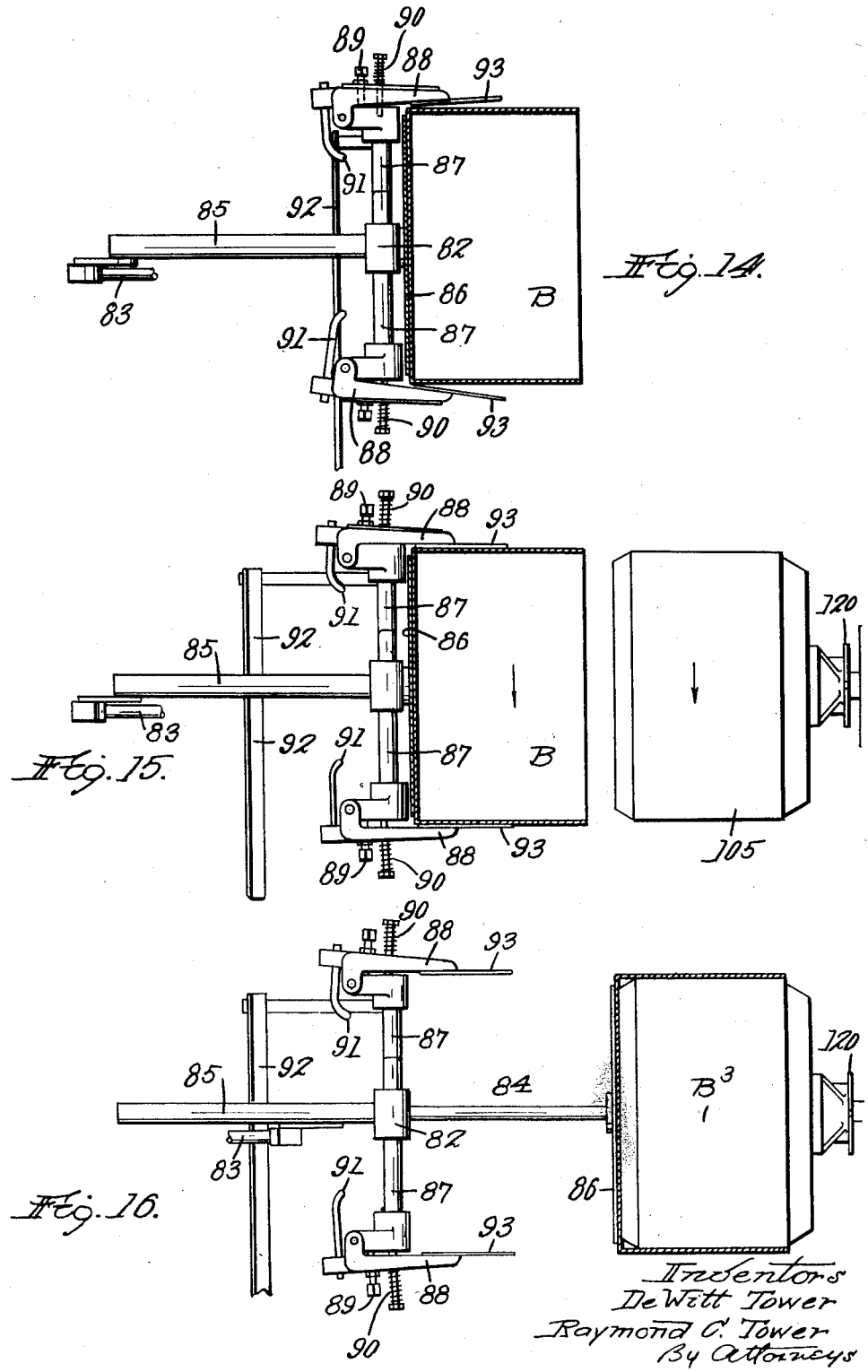

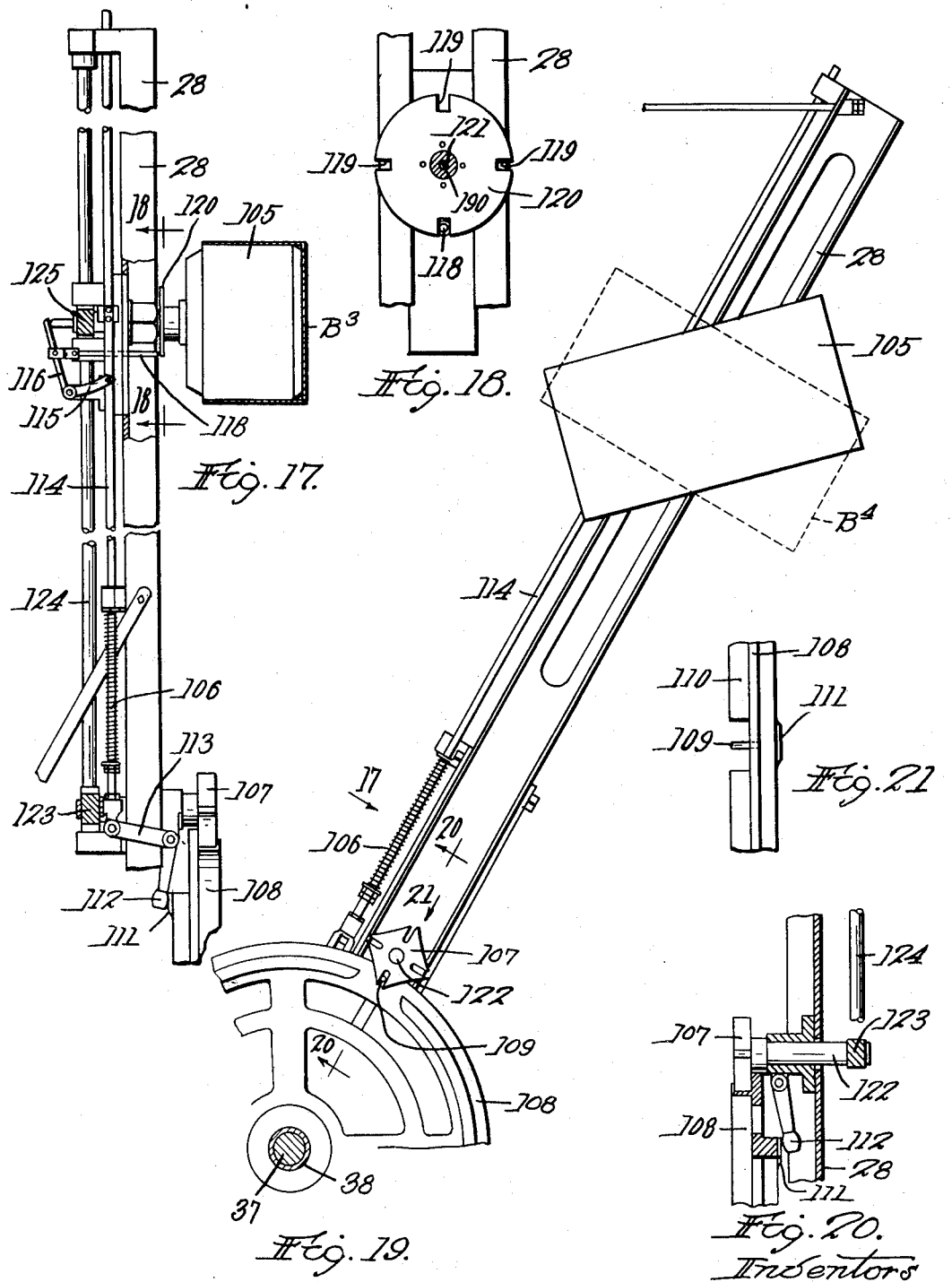

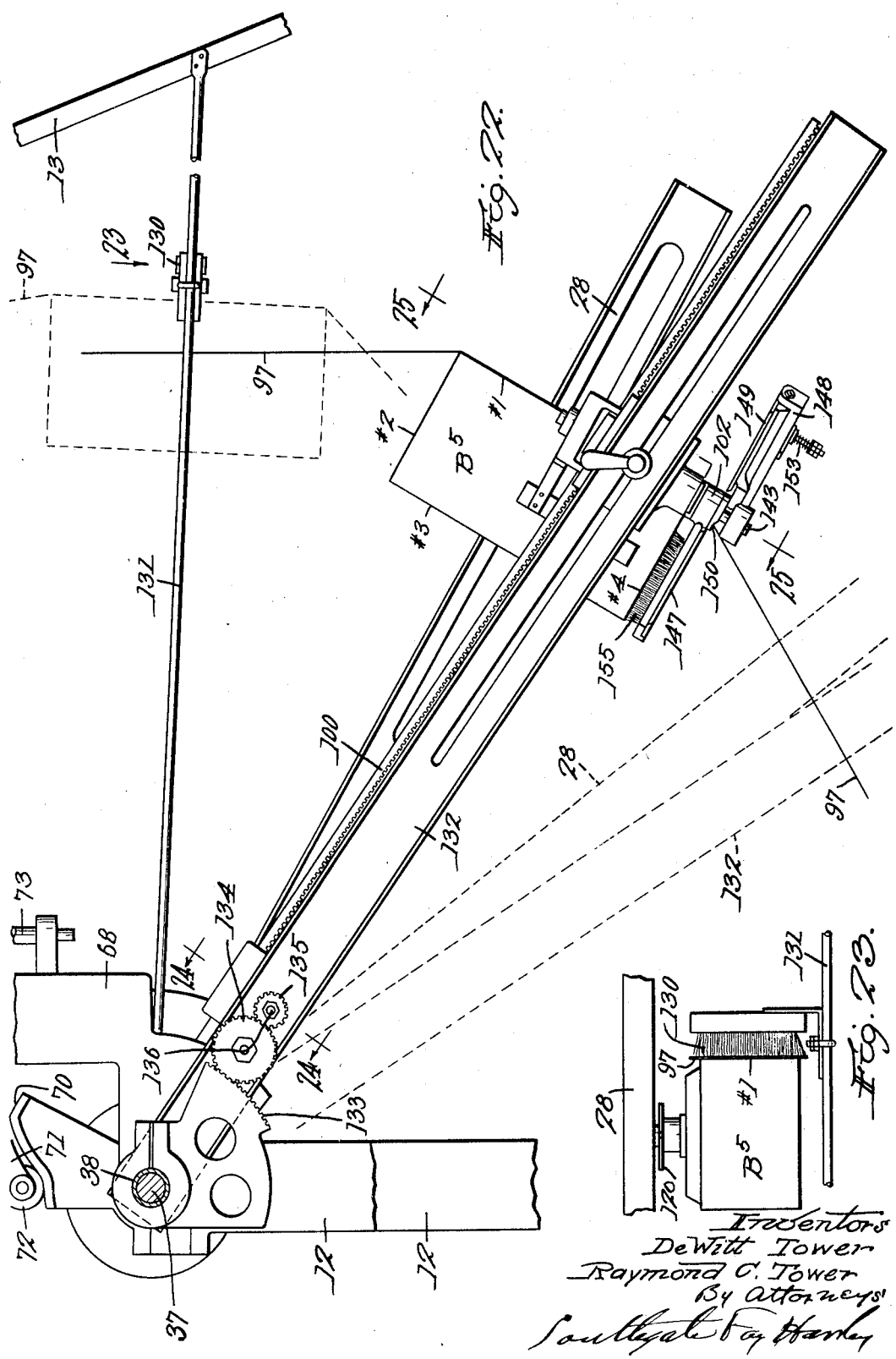

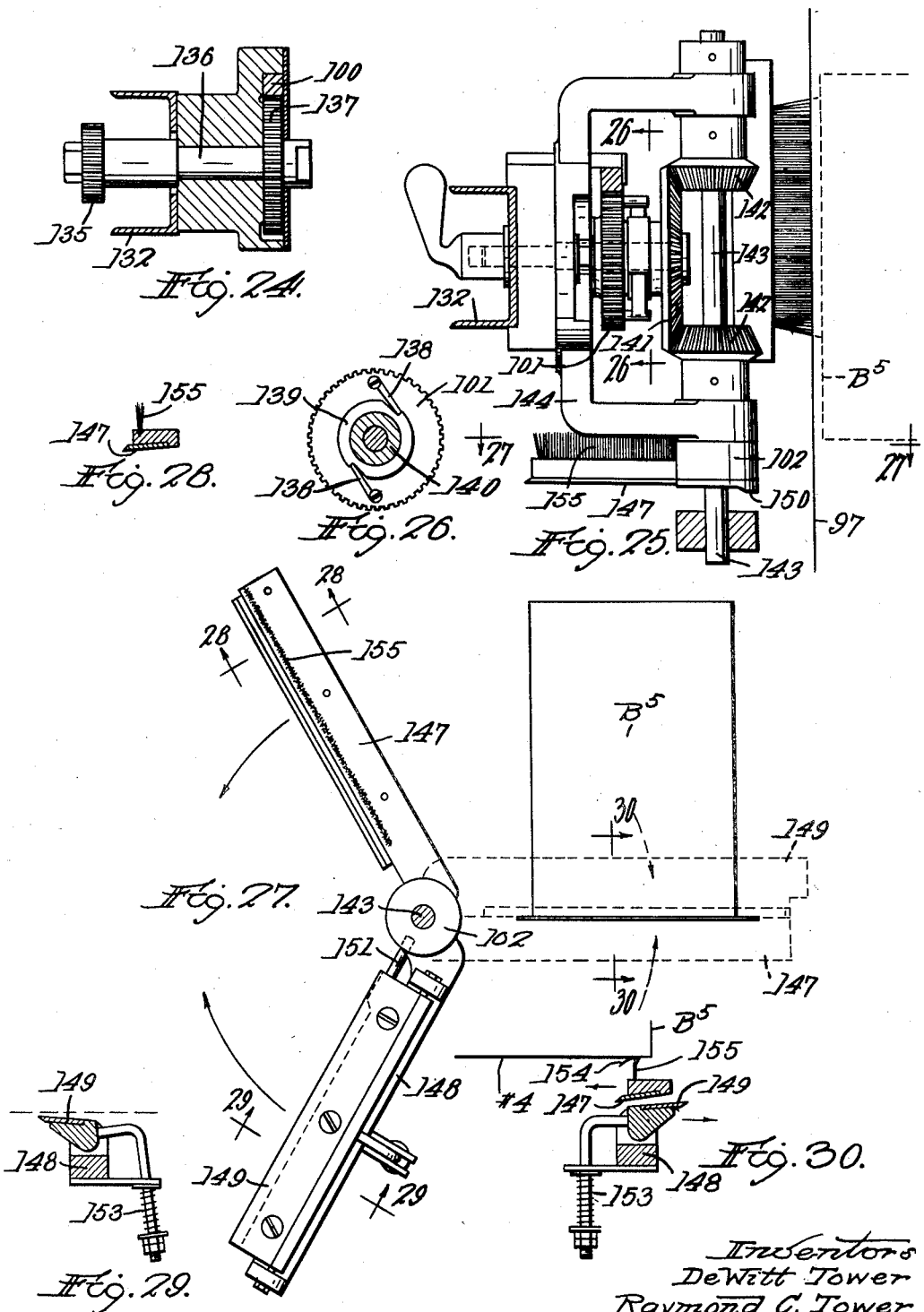

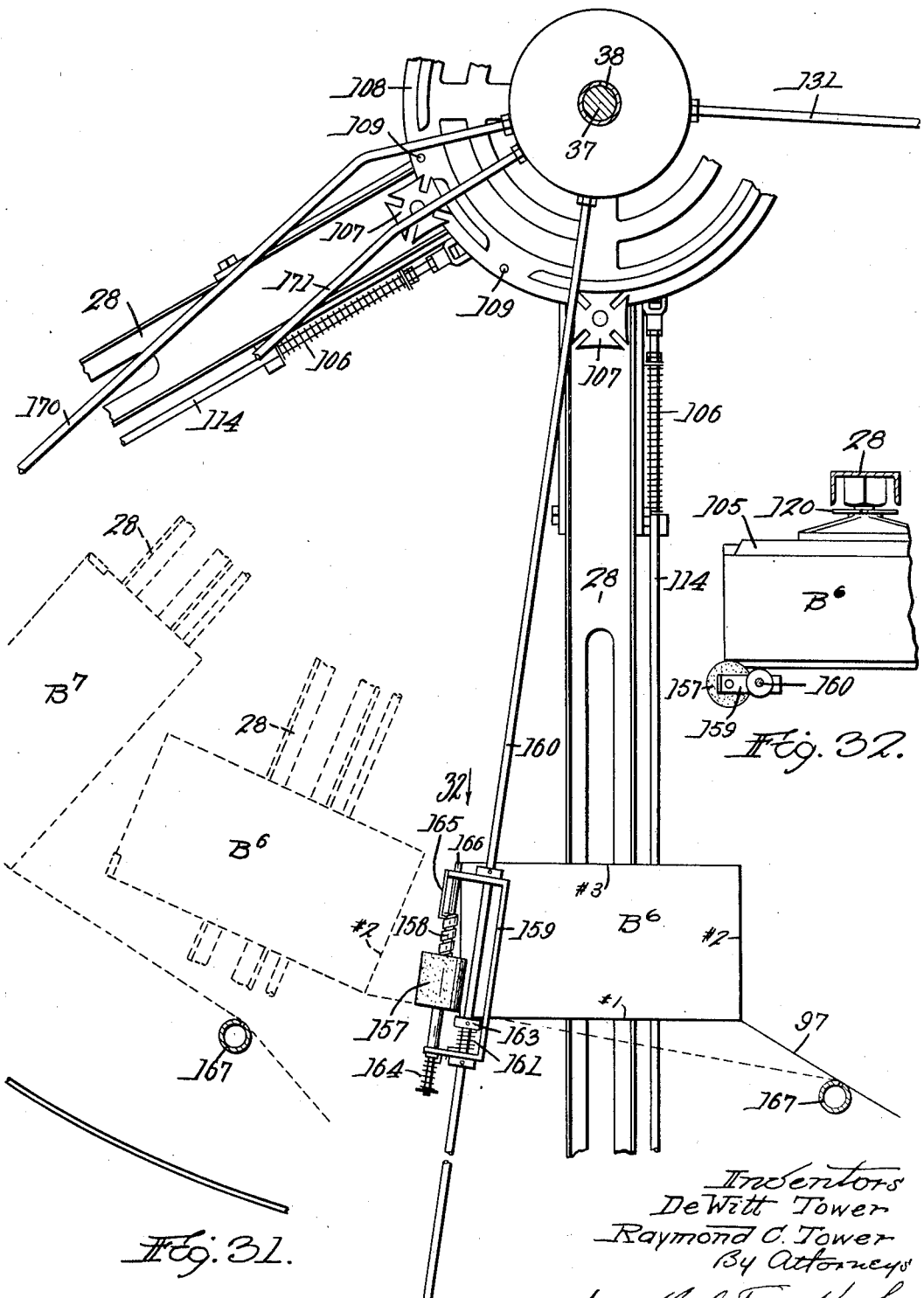

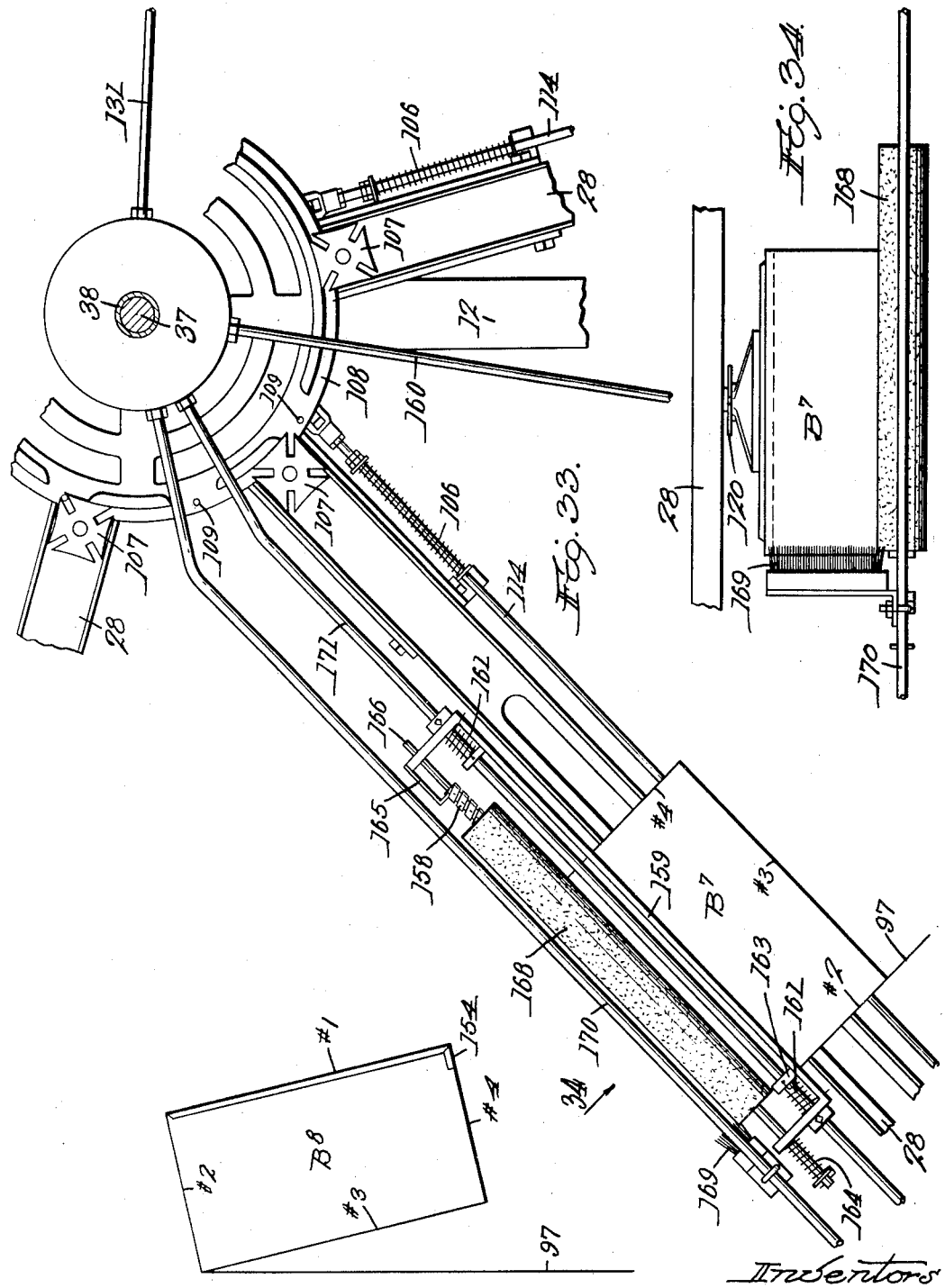

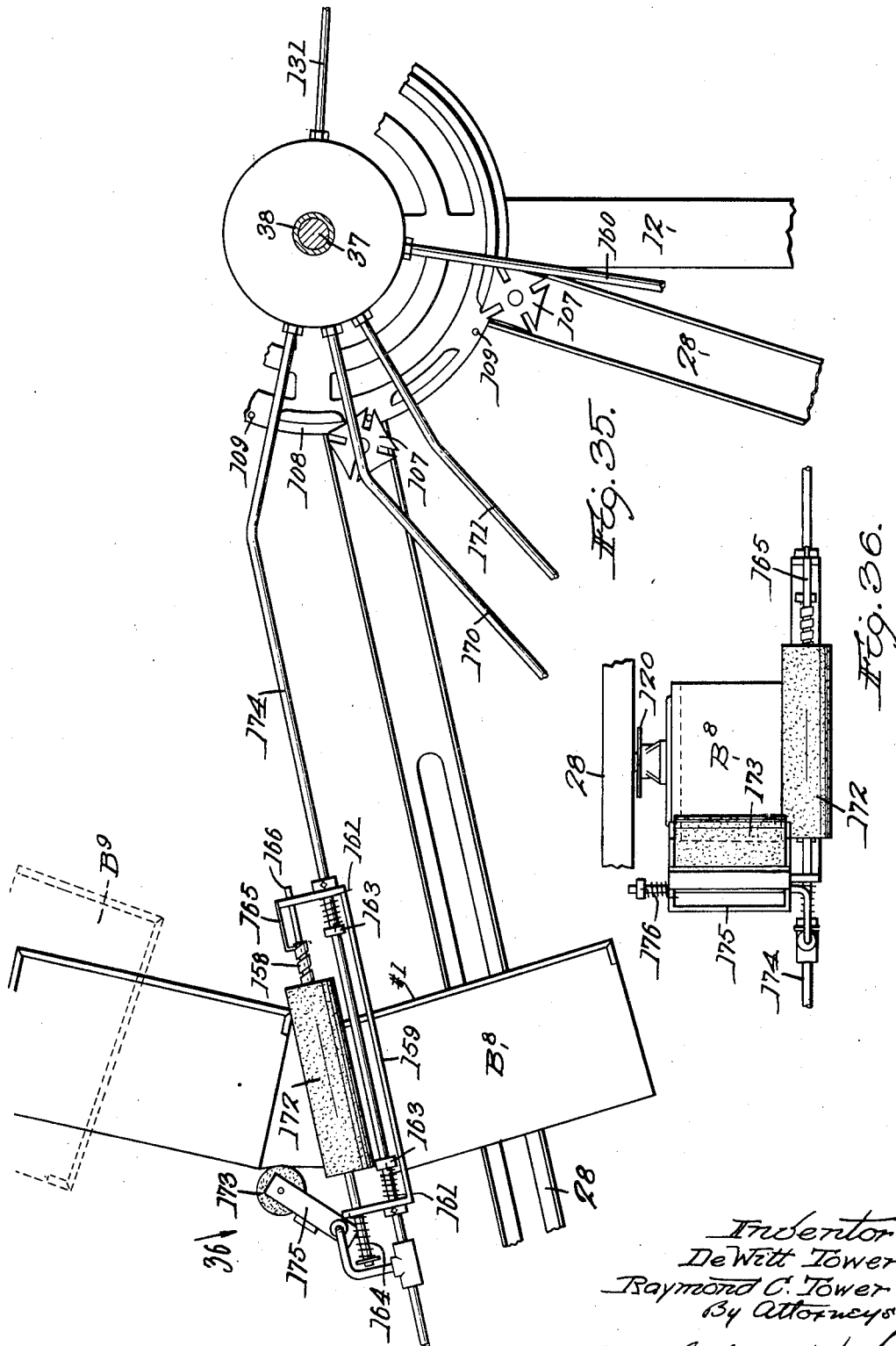

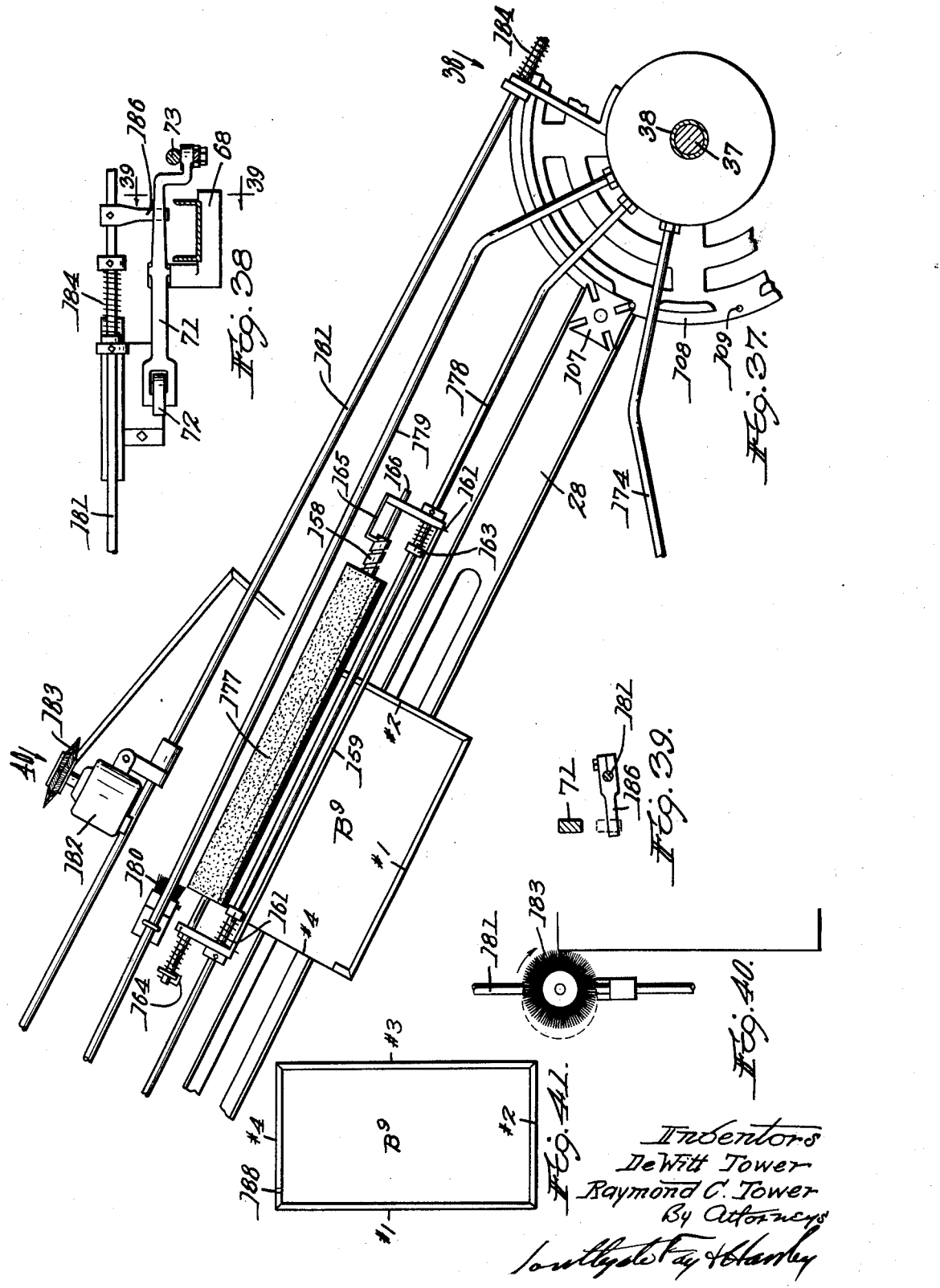

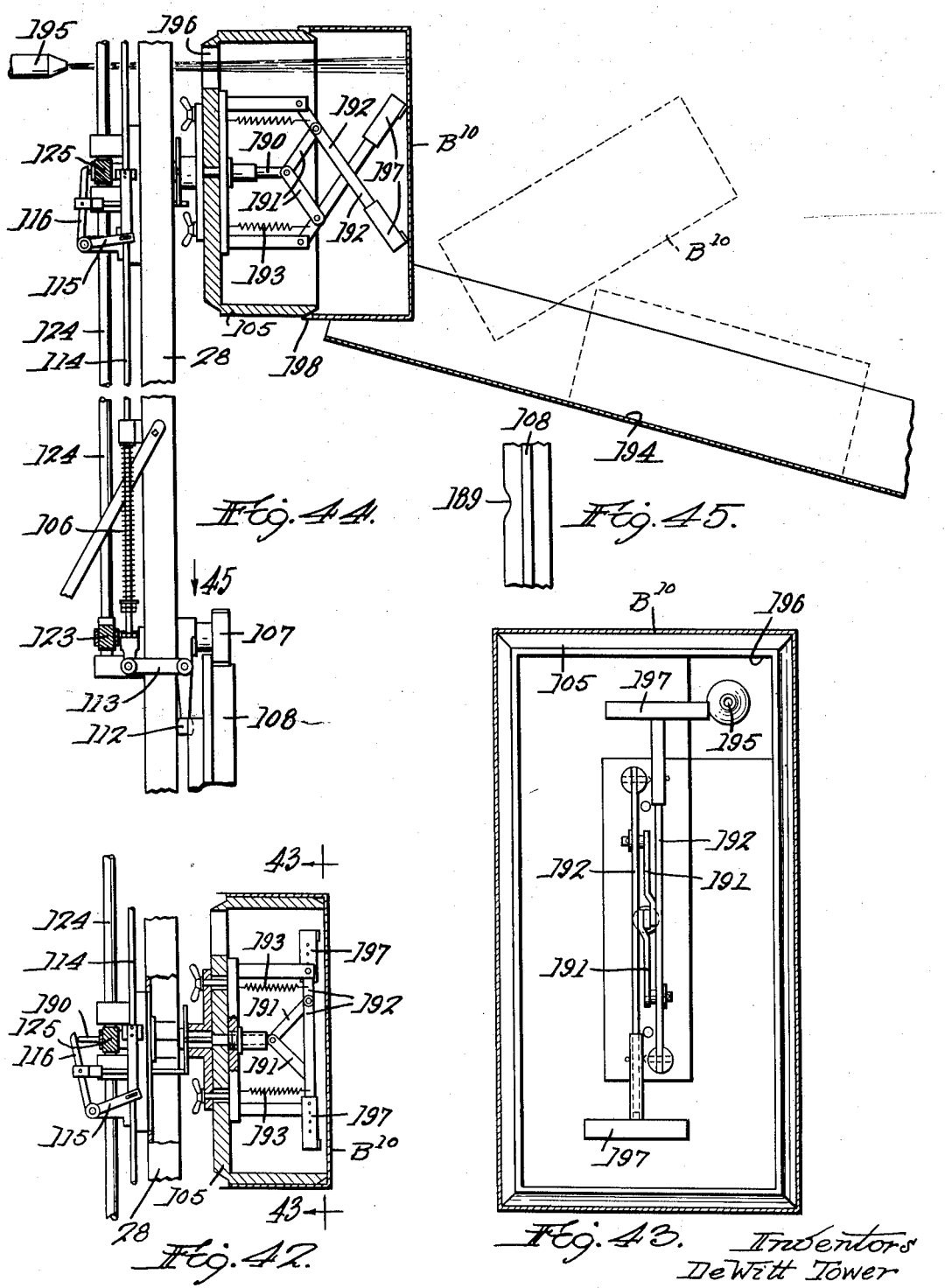

1,961,436

UNITED STATES PATENT OFFICE 1,961,436

BOX COVERING MACHINE

De Witt Tower and Raymond C. Tower,
Spencer, Mass.

Application January 26, 1932, Serial No. 588,911

35 Claims. (Cl. 93—54)

This invention relates to a machine for covering boxes or other similar articles with paper, although the principles of this invention are capable of use for covering many articles and using many sheet materials for covering. It is designed particularly for covering pasteboard shoe boxes with glazed paper and will be described in connection with that use.

The principal objects of the invention are to provide means for feeding boxes or other articles automatically into a machine at suitable intervals, bringing them around through a cycle of operations which result in the taking up of the gummed covering paper or other sheet material and completely covering the sides and ends of the boxes therewith and then discharging them all, by automatic operations not requiring the constant attention of an operator; to provide a simplified timing device for controlling the feeding of the boxes into the machine; to provide a machine in the form of a rotary wheel having a series of radially supporting arms thereon for supporting the boxes and carrying them through their various operations and means for automatically controlling and operating various features to perform the various pasting operations; to provide means for supporting a hopper for receiving the boxes from the said conveyer and for automatically moving, when the wheel turns, into position to receive a single box, means for adjusting the hopper to the size of the box and for operating the hopper sufficiently to receive the box in proper place and then transfer it to a form carried by the wheel; to provide means for controlling the starting of the timing device above mentioned and the running of the machine by the operation of a single starting lever; to provide an improved hopper for receiving the box and means whereby one of the walls of this hopper itself can be used for ejecting the box from the hopper and applying it to the form to carry it through the machine; to provide a rotary form mounted on each arm of the machine and means for intermittently rotating said forms a part of a revolution at a time to bring the different sides of the boxes into position for taking up the paper and winding it around them; to provide a simple form of indexing device for controlling the position and preventing the change of position of the forms except where desired; to provide a simple and accurately operating means by which the mechanism on each of the arms of the frame will be actuated to perform the desired functions in exactly the proper time ratios; to provide improved means for cutting off the paper in exactly the right length to cover a box; to provide a series of brushes arranged so that, although the brushes or rolls are stationary, they will operate on the various sides of the box with efficiency and all complications required for operating rotary brushes will be avoided; to provide a system of rollers for rolling down the projecting edges of paper around the four sides of the box and sticking them to the bottom of the box, so arranged that these rollers will move constantly away from the edge of the box toward the center of the machine, thus performing a wiping operation and avoiding all danger of rumpling up the edge of the paper stuck down on the bottom of the box; to provide a simple and effective means for wiping down the last edge of paper on the bottom of the box and to associate with it means for moving the brush used in this operation out of the way to avoid injury to the first edge pasted on the box over which the last edge is pasted down; to provide an improved form of stripping or ejecting device for removing the box from the form on which it has been carried all this time; to provide pneumatic means for assisting in the ejection of the box from the form; to provide a simple and effective means for holding back the web of paper, the forward end of which is attached to the box, while the box is moving along its path with the paper depending therefrom; to provide improvements in the various features and elements of the machine which render it capable of general use and particularly adapted for the covering of shoe boxes and articles of a similar nature, and to provide a completely automatic machine for performing all these operations.

Other objects and advantages of the invention will appear hereinafter.

Reference is to be had to the accompanying drawings, in which

Fig. 1 is a front elevation, partly diagrammatical, of a machine constructed in accordance with this invention;

Fig. 2 is a sectional view on the line 2—2 of Fig. 1;

Fig. 3 is a sectional view on the line 3—3 of Fig. 2 showing the drive;

Fig. 4 is an end view of a mechanical motion shown in Fig. 3 in a different position;

Fig. 9 is a side elevation of the parts shown in Fig. 8 and feed belt operation, looking in the direction of the arrow 9 in Fig. 8;

Fig. 10 is an elevation of the hopper taken in the direction indicated by the arrow 10 in Fig. 9;

Fig. 11 is a sectional view on the line 11—11 of Fig. 10 showing the hopper in elevated position;

Fig. 12 is a plan of the means for introducing the boxes into the machine as indicated by the arrow 12 in Fig. 9;

Fig. 13 is a longitudinal sectional view of the same on the line 13—13 of Fig. 12;

Fig. 14 is a top view looking in the direction of the arrow 14 in Fig. 9 of the receiving hopper with the box in position and shown in section before the box is gripped;

Fig. 15 is a plan showing the box gripped;

Fig. 16 is a similar plan showing the box having been located on the form and released from the hopper;

Fig. 17 is a side elevation of the parts supporting and carrying the form in the same position as shown in Fig. 16, but with the form shown turned a quarter of the way around;

Fig. 18 is a sectional view on the line 18—18 of Fig. 17 showing the form indexing device;

Fig. 19 is a front view of the arm shown in Fig. 17 and connected parts;

Fig. 20 is a sectional view on the radial line 20—20 of Fig. 19;

Fig. 21 is an edge view of the indexing cam as indicated by the arrow 21 in Fig. 19;

Fig. 22 is a front elevation of a part of the machine showing the step of cutting off the paper and wiping down the advance edge of the paper on the first side of the box;

Fig. 23 is a top view of a portion of a wiping brush as indicated by the arrow 23 in Fig. 22;

Fig. 24 is a sectional view on the line 24—24 of Fig. 22 showing a part of the drive for the cutters;

Fig. 25 is a sectional view on the line 25—25 of Fig. 22 showing the drive mechanism for the cutters;

Fig. 26 is a sectional view of a reverse preventing device on the line 26—26 of Fig. 25;

Fig. 27 is a sectional view on the line 27—27 of Fig. 25 showing the operation of the cutting mechanism;

Fig. 28 is a transverse sectional view of one of the cutting blades on the line 28—28 of Fig. 27;

Fig. 29 is a similar view of the other cutting blade on the line 29—29 of Fig. 27;

Fig. 30 is a sectional view showing the cutting blades just after the cutting operation, taken on the line 30—30 of Fig. 27;

Fig. 31 is a front elevation of another part of the machine showing the beginning of the operation of wiping down the edge of the first side of the paper on the bottom of the box;

Fig. 32 is a plan of part of the same as indicated by the arrow 32 in Fig. 31;

Fig. 33 is a front elevation of another part of the machine showing the box turned one-quarter way around from the position shown in Fig. 31;

Fig. 34 is an elevation of a part of the same looking in the direction indicated by the arrow 34 in Fig. 33;

Fig. 35 is a front elevation of another part of the machine showing the box in the position in which it has made another quarter turn;

Fig. 36 is a plan of the same as indicated by the arrow 36 in Fig. 35;

Fig. 37 is an elevation of another part of the machine showing the box having made another one-quarter turn which has brought it all the way around;

Fig. 38 is a plan of part of the same, looking in the direction of the arrow 38 in Fig. 37;

Fig. 39 is a sectional view on the line 39—39 of Fig. 38;

Fig. 40 is a plan looking in the direction of the arrow 40 in Fig. 37 and showing the action of the last brush, completing the wiping operations;

Fig. 41 is a bottom view showing the box as completed by this machine;

Fig. 42 is a longitudinal sectional view of the form for holding the box showing the box thereon completed;

Fig. 43 is a sectional view on the line 43—43 of Fig. 42 showing the open side of the form in elevation and the box in section;

Fig. 44 is a view like Fig. 42 showing the ejector mechanism expanded to remove the box from the form, and Fig. 45 is an edge view of a portion of the controlling disc showing the ejector cam.

Figure 5:
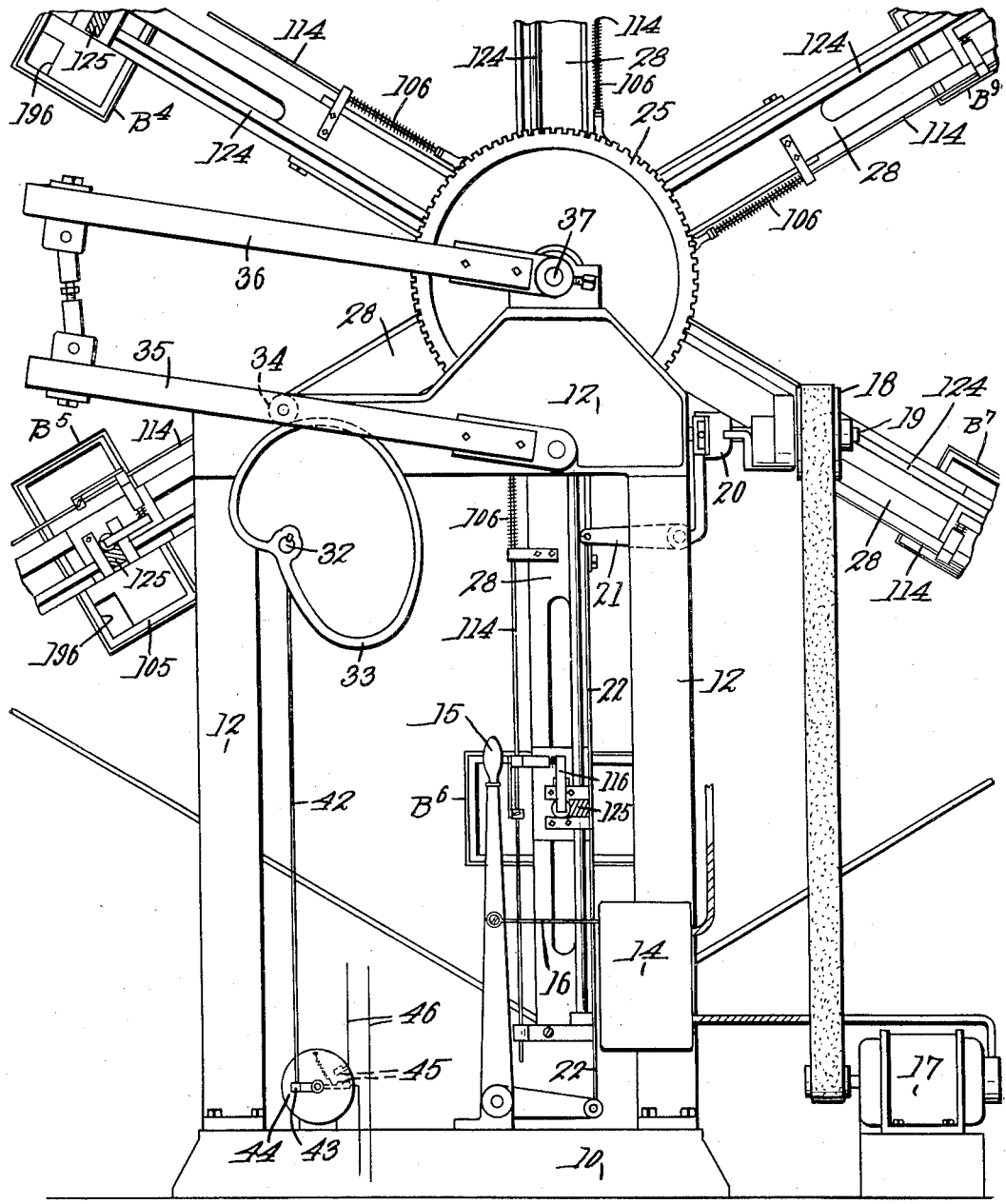
Fig. 5 is a rear elevation of a part of the machine as indicated by the arrow 5 in Fig. 2.
Figure 7:
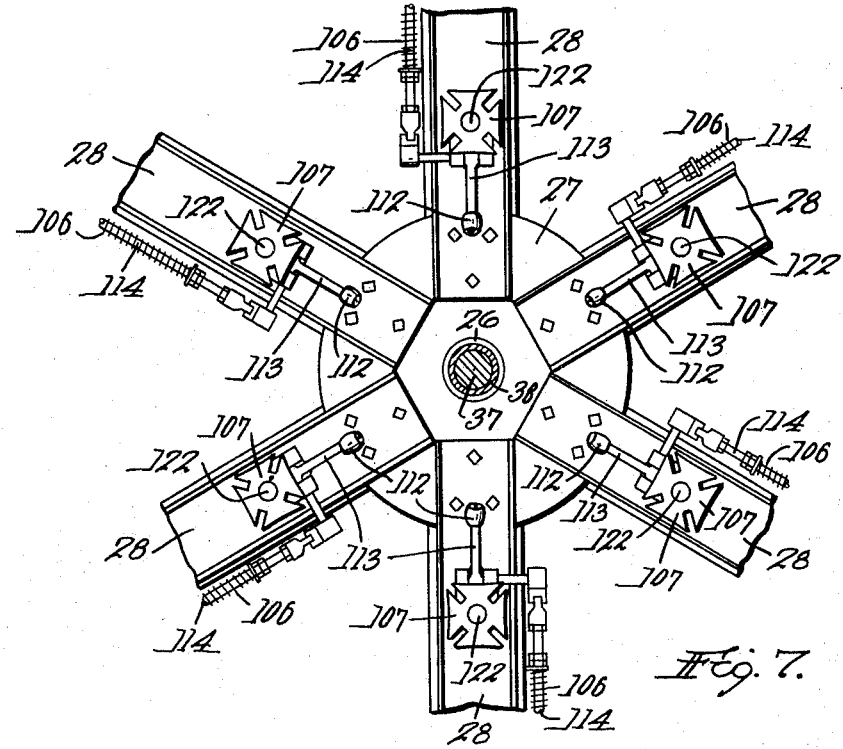
Fig. 7 is a sectional view on the line 7—7 of Fig. 2.
Figure 6:
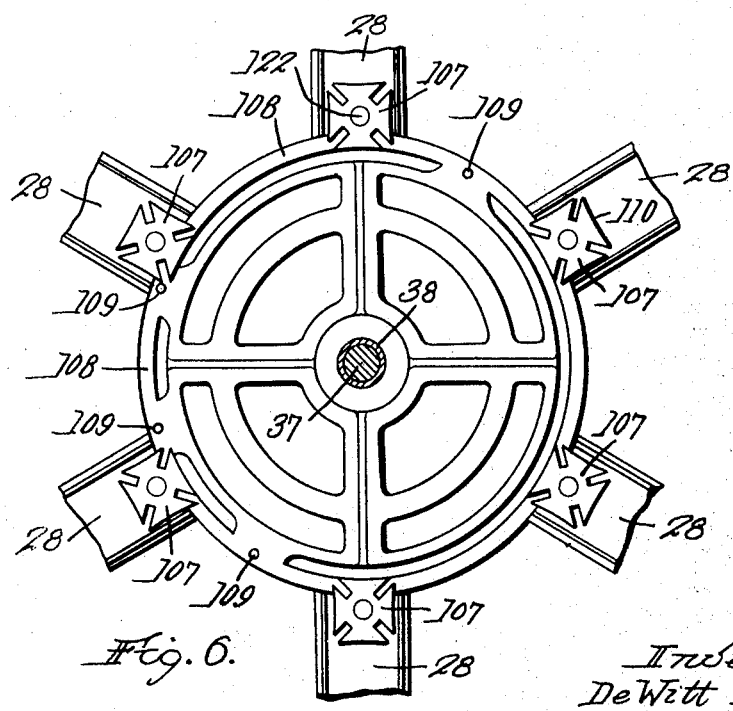
Fig. 6 is a sectional view on the line 6—6 of Fig. 2.

The machine is shown in a form in which the parts are supported on bases 10 and 11, and a main frame 12 carries the rotating wheel, while some other parts are supported and guided by an auxiliary frame 13 supported by both of the bases.

On the frame 12 is carried a switch box 14 operated by a starting lever 15 to close it by a link 16. The purpose of this switch is to connect up a brush operating motor 182 and a motor for operating a blower delivering air through a nozzle 195.

The operating motor 17, through a belt, drives a pulley 18 on a shaft 19. This shaft is provided with a clutch 20 adapted to be operated by a lever 21 and link 22, this link being connected with an arm on the starting lever 15, so that the operation of this lever will close the clutch.

The shaft 19 is provided with a worm 24 operating a gear 25 fixed to a sleeve 26. This sleeve carries the hub 27 of a rotating frame composed of a series of arms 28 which support the forms and boxes as will appear. On the shaft 19, of an extension thereof which rotates with it, is another worm 30 operating a gear 31 fixed to a shaft 32. On the shaft 32 is a cam 33. The cam 33, of course, rotates constantly and operates a roll 34 on a pivoted arm 35. This arm through a turn-buckle connection is adjustably connected with an arm 36 which is fixed on a shaft 37 concentric with the sleeve 26 and located inside it. It will be seen, therefore, that the rotation of the main shaft rotates the sleeve 26 and oscillates the shaft 37. Between these two elements is a stationary sleeve 38 supported by the frame 12.

On the shaft 32 is a cam 40 running in a strap 41. The shape of the cam and strap is segmental. Therefore, as this shaft 32 rotates the strap will rise and fall as indicated in Fig. 4. The strap has a rod 42 connected with an arm 43 on a switch 44. Every time the shaft rotates it opens and closes a pair of contacts 45 and energizes a line 46. This energizes a solenoid 47, Fig. 9, when the contacts close and pulls down a rod 48 connected with a lever 49. This is a feeding lever having stops 50 and 51, Fig. 13, at the opposite ends. It is pivoted on a rod 52 and of course, the rod 48 moves up by a counterweight when the solenoid is not energized. As will be explained hereinafter, the boxes B to be covered with paper are brought into this time feed device and Fig. 13 shows how it works. The boxes move on a conveyor 53 and are held by the stop 51 in spite of the frictional action of the conveyor underneath. Then when the solenoid is energized the stop 51 rises and releases the front box while the stop 50 descends and holds back the next box. This action proceeds intermittently, allowing one box at a time to come into the machine and these boxes are timed with respect to the shafts 32 and 37 so as to provide for entering them into the machine in proper sequence and in proper relation to the position of the parts of the machine.

The conveyer 53 is carried by a series of rolls 54 mounted on a frame 55. This frame is slidably mounted on rods 56 carried in stationary position by the base. The adjustment up and down is done by hand and a hand screw 57 is used to hold it in adjusted position. This frame carries not only the rolls 54 but also the solenoid 47 and the feed lever 49. It also carries a roll 58 over which passes the feed-in conveyer 59 which can be driven in any desired way. This is a slanting conveyer on which the boxes are brought to the horizontal conveyer 53.

On the shaft 19 is a pulley which, by means of a belt 60, drives a shaft 61. This shaft by proper gearing drives a pulley which carries a belt 62. This belt drives a double pulley 63 which is mounted on an articulated frame 64 and, by means of its shaft 65 and pulley, drives another belt 66, which drives a pulley on the shaft of the delivery roller 54 for the conveyer 53. This articulate frame is adjustable longitudinally and movable laterally to provide for the vertical adjustment of the frame 55 which has been described.

The frame 55 also carries a deflector 67 which the boxes B engage as they pass over into a position B' shown in Fig. 13. Here they drop into a hopper. On the shaft 37 is a frame 68, Fig. 8, oscillating, of course, with the shaft.

Carried on the frame 12 or, more specifically, on the cap of the box which supports the shaft 37 is a stationary cam 70. On the frame 68 is mounted a lever 71 having a roll 72 engaging this cam. This shaft 37 oscillates and the frame with it, in synchronism with one of the arms 28, from the normal vertical position shown in Fig. 8 in full lines to the dotted line position shown in that figure.

A rod 73 carried by brackets on the frame 68 will be lowered by the lever 71 which is connected with this rod. On the rod is adjustably fixed a vertical rack 78 adapted to be held in adjusted position by a hand screw 74. The frame 68 has a vertical extending portion having a vertical slot 75 through which passes a hand screw 76 by which a bracket 77 is fixed in adjusted position along the slot. A spring holds the lever 71 in a position for the roll 72 to always engage the cam 70. With the rack 78 meshes a pinion 79, (Fig. 10) fixed on a shaft 80 carried by the bracket 77. Coiled around this shaft is a spring 81 having one end fixed to a collar fixed to the shaft and the other end engaging a frame 82 pivoted on the shaft.

The frame 82 has two extensions in which is located a pivot head, carrying an arm 83. This arm is connected by a link with an arm on the shaft 80 moving with it. When this shaft turns, the arm 83 will turn with it. This arm is connected at the upper end with a slide 84 in a stationary tube 85 carried by the frame 82, which tube is slit to allow the slide to move from the full to the dotted line position in Fig. 11. On this slide is fixed the bottom 86 of the hopper above mentioned and this causes the bottom of the hopper to move from the full to the dotted line position in Fig. 11, for a purpose to be described.

The frame 82 carries two rods 87 extending in opposite directions from it and adjustable to vary the width of the hopper. At the end of each rod is a casting having an arm to which is pivoted a lever 88. This lever is provided with an adjustable stop 89, Fig. 14, engaging the casting and with a spring-pressed rod 90 for normally forcing it in at its outer end. Each lever is also provided with an operating rod 91. These two operating rods extend downwardly and are engaged by a bar 92 which is mounted on the frame 77. When this bar engages these two rods 91, it forces them to the position shown in Fig. 14 and thereby swings the two levers 88 outwardly. These levers are provided with plates 93 for engaging the sides of the box but when the parts are in the position for receiving the box they are inclined as shown in Fig. 14. When the frame 82 moves forward, the springs 90 are free to move these plates in as shown in Fig. 15 to hold the sides of the box. Obviously these plates have to be adjustable as stated, for boxes of different widths. The frame 82 has a lost motion and it is only when an arm on it engages an adjustable stop 95 that the slide 84 starts to move the bottom 86.

It will be seen therefore that as the box is passed by the conveyer 53 over the delivery roll of that conveyer and comes to the slanting position shown in Fig. 13, it will come into the inclined hopper just described which, at that time, is in inclined position with the plates 93 apart in a diverging position.

It will be noticed that a brush 99 is provided on the bracket 77 and therefore in stationary position for engaging the bottom of the box B to insure its mounting on the form in a straight and even condition.

Figure 8:
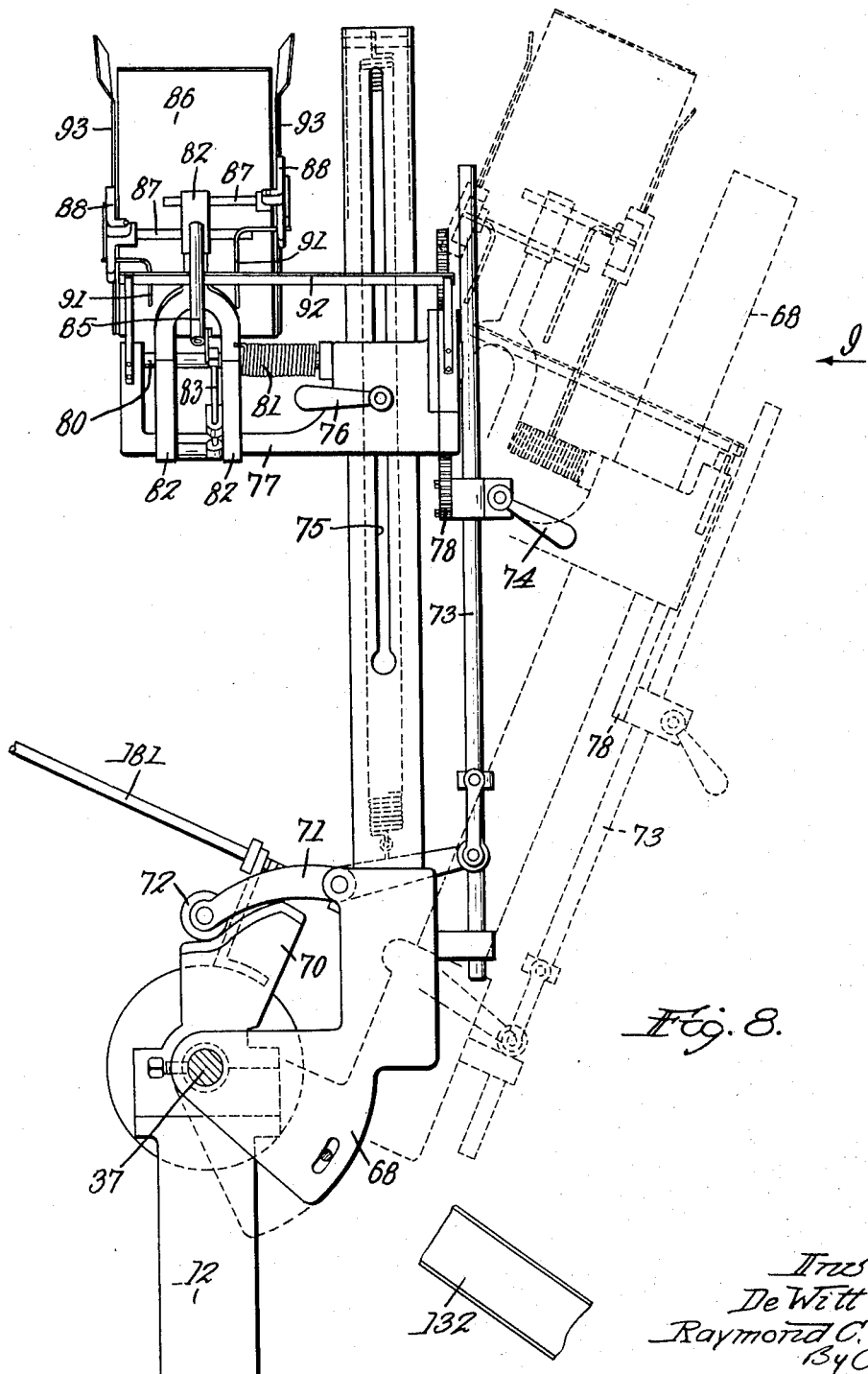
Fig. 8 is a sectional view on the line 8—8 of Fig. 2 showing the parts in two positions.

It will be understood that, in the receiving position of the hopper, the arm 68 is vertical as indicated in full lines in Fig. 8 and after the box is received in it the whole structure turns to the position shown in dotted lines in Fig. 8 and during that motion the box is ejected from the hopper as is indicated in Fig. 11.

When the pasteboard shoe or other box B is to be covered with paper and has been deposited in the hopper in the position $B^2$ it is ready for the operation just described which brings the box into registration with a form 105 and finally applies it to the form in the position $B^3$.

Referring now to Fig. 1 it will be seen that the rotating part of the machine, which is rotated by the sleeve 26, comprises in this instance the six rotating arms 28. The vertical arm is in the feed position, that is, $B^2$. The spider 27 on the sleeve 26 supports these six arms, which are secured to it in any desired way. Each arm is provided with a Geneva wheel 107. Fixed on the stationary sleeve 38 there is an operating disc 108 which is stationary, for operating the Geneva wheels in the proper order.

This disc is provided, in the present instance, with four pins 109 for operating the Geneva wheels, a quarter turn at each of four positions and, of course, this Geneva wheel is provided with a series of arcuate surfaces 110, each one engaging a concave surface on the operating disc 108, to hold them against any accidental rotation between the quarter turn operations. The rotation of one Geneva wheel, as for example the one on the vertical arm, is shown in Figs. 17 to 21.

On the disc 108 opposite each one of the pins 109 is a cam 111 operating a roller 112 on a bell crank 113. This bell crank is connected with a rod 114 on the arm 28 and pressed by a spring 106 downwardly so as to hold the roll in contact with the cam. Pivoted to this rod 114 is an arm 115 which operates a lever 116. When the cam 111 moves the rod 114 up, the lever 116 is moved to withdraw the indexing pin 118. This indexing pin is adapted to be projected through one of the four notches 119 of a disc 120 on a shaft 121 carried by the arm 28. It is on this shaft that the form 105 is mounted.

In Fig. 17 the box is shown mounted on this form as it is left by it in Fig. 16 in the position B³. This form is of the same shape as the box, of course. The shaft 121 is operated in the following way. The turning of the Geneva wheel on the arm 28 one quarter of a revolution turns a shaft 122 on which the Geneva wheel is fixed and through spiral gears 123 rotates a shaft 124 which, through spiral gears 125, one of which is on the hollow shaft 121, rotates the disc 120, the shaft 121 and the form 105 one quarter of a revolution. This is shown being done in Fig. 19 and also is indicated in dotted lines in Fig. 1. This quarter of a turn performs no function except to bring the form and box into the position B⁴ when this arm is turned to that position. In other words the form is located transverse to the arm at this point or tangential.

It is in this position B⁴ that the box first comes into contact with the pasted covering paper 97 with which this machine surrounds it.

It will be noticed that in two positions B⁵ and B⁶ the paper contacts with the box B on the form. Let it be assumed for the time being that the end of the paper be pasted over the far end of the box as shown in the position B⁶ and pressed down along the box on one of its long sides, No. 1. The paper is supplied from a roll 127 mounted on the framework 13 and carried over a pasting drum 128 and around guide rolls 98, all but one of which engage the unpasted side of the paper, to a position to come down past the box in the position B⁴ and be applied to it as will appear later. In passing from the position B⁴ to the position B⁵, the paper, gummed on its inner surface, is merely applied to one long surface, No. 1, of the box.

During the progress of the box on the form from the position B⁴ to the position B⁵ the paper is wiped on the first side of the box with which it is in contact at this time by a brush 130 fixedly but adjustably mounted on a rod 131 carried by the frames 12 and 13 and in this case shown as arranged horizontally. The box, of course, is backed up by the form and this is an efficient wiping operation.

Now the form comes to the position B⁵. Here there is an arm 132 mounted on the frame 68 and oscillating with it. On the frame 12 is a fixed gear segment 133 and, as the arm 132 oscillates, it oscillates the gear 134 and a pinion 135 on the arm. This pinion is on a shaft 136 supported by the arm 132. On the other end of this shaft is a gear 137. The gear meshes with a sliding rack 100 carried in guides on the arm 132 with the rack 100 meshing with a gear 101 loose on a shaft 140. The gear 101 is provided with two opposite pawls 138 which engage two opposite teeth on a disc 139, the disc being fixed to the shaft 140. On this shaft is a bevel gear 141 meshing with two bevel gears or pinions 142 having the opposite bevel pinions fixed, one on a shaft 143 and the other on a sleeve 102 into which the shaft passes. The shaft and sleeve are supported by a frame 144 carried by the arm 132. Therefore the complete rotation of the shaft 136 which takes place during each half oscillation of the arm 132 rotates the shaft 143 and its sleeve in opposite directions through a complete rotation. The shaft 140 is prevented from turning backward with the gear 101 by the pawls 138.

On the shaft 143 is a blade 147 and on the sleeve 102 is an arm 148. This arm has a pair of projections which carry a pivoted cutting blade 149. On the sleeve is a cam 150 adapted to engage a pin 151 carried by the blade 149. During most of the rotation of the shaft and sleeve this pin holds one blade out of the other's plane so that they cannot come into contact with each other. The two blades are intended for cutting off the paper and when they have overlapped and come into cutting position, the pin 151 slides off the high part of the cam 150. A rod 152 is mounted on the blade 149 which is held on the arm 148 but is loosely mounted and is provided with a spring 153 so that it can move into the two positions shown in Figs. 29 and 30. When released by the cam 150 and two blades come into cutting relationship with each other and they cut the paper extending down from the No. 1 side of the box to the box B⁶ ahead of it so that a flap 154 is left adapted to be pasted to the box later. As the blade 147 continues to rotate, a brush 155 thereon wipes the flap 154 down on the No. 4 side of the box at the edge to fix the forward end of the paper to the box.

The forms are adjusted out and in on their respective arms, all of course, at the same distance from the center, to such a distance that the paper passing from any point between one station and on to the corresponding point between the next two stations will be just long enough to cover the four sides of the box, leaving a small amount to lap over.

There is no action performed on the box or paper between the stations B⁵ and B⁶. The position of the paper shown in Fig. 1 indicates what may be considered the starting operation. The paper has to be drawn through to the point shown therein where it passes over the first side of the box at station B⁶ and just laps over the edge thereof as described. At this time the box in the station B⁵, of course, is ready for the cutting operation and the box at the station B⁴ is just engaging the paper.

Everything now being started, the machine continues to operate. As the box passes the station B⁶, a rubber, felt or other soft surfaced roll 157 mounted to rotate and to reciprocate on a helically grooved shaft 158 will move along the edge of the box to wipe down the edge of the paper which is projecting beyond the bottom of the box to fold it over on to the bottom and hold it there. This roll is carried by a frame 159 pivoted on a stationary rod 160 and shown as arranged radially. The rod 160 has a spring 161 upon it engaging at one end in a collar 163 adjustably fixed to the rod, and also bearing against the frame so that the roll will yieldingly be pressed against the box. A hook 165 is fixed on the frame for engaging the threads of the shaft 158 to cause the shaft to move along a fixed rod 166 on the frame which passes through this hollow shaft. The rotation of the roll is caused by the friction of the box on the roll as it passes under it. A spring 164 moves the roll back to starting position after the box passes beyond it. The position of the roll on the box is indicated in Fig. 32.

It will be noted that from the position B$^4$ to the position B$^6$, the box is not turned on its own axis but as the box passes from the position B$^6$ to the position B$^7$ it is given another quarter turn by means of the Geneva motion and of course when it gets to the position B$^7$ is in a position one quarter way around from that in B$^6$ and is held by the indexing pin. Of course, during this quarter turn, the gummed paper is laid on the second side or end of the box. In this position the end of the paper hangs down from the lower corner of the box ready for the next operation.

During any of these motions the hanging end of the paper can be supported by cross rods to keep it from flapping around and getting into the machinery, but it is preferred to support it by tubes 167 which have perforations along the side for engaging the paper and are connected with an air exhauster. This furnishes a little drag or tension on the paper to keep it straight and cause it to lie closely on the box during the next operation.

As the box passes from the position B$^7$ it passes under a roller 168, which is operated in the same way as the roller 157 and, as shown at the upper left hand corner of Fig. 33, lays the edge of the paper down on the first side of the bottom of the box. The edge which was previously lapped over the fourth side is not rolled down by this roller. The roller in each case is moved inwardly toward the center of the machine to avoid any possibility of the roller engaging the edge previously laid down. After the box passes the roller 168 the end of the box passes by a brush 169 and the second side or end is wiped down by this brush. This brush is adjustably supported on a stationary rod 170. The roller 168 and the frame on which it works is supported by a stationary rod 171, these rods serving the same purpose as the rod 160.

Now in the next position B$^8$, where the box has turned another quarter turn, a roller 172 like the roller 168 wipes down the edge of the paper on the second side of the bottom of the box as the box passes it. Furthermore, the paper on the third side is wiped down by another roller 173. A rod 174 supports both rollers. The roller 173 is on a pivoted frame 175 carried by an extension on the rod 174 and having a spring 176 for holding it against the box.

The box is now back in the position with its short sides or ends radial and comes to the position B$^9$. By this time three sides of the box are covered and it comes into contact with another roll 177 acting like the roll 168 and supported by a rod 178 and frame. This turns down the edge of the paper on the bottom on the third side of the box, one of the long sides. In this case too there is another rod 179 which adjustably supports a stationary brush 180 and wipes down the fourth side or end of the box as the box passes beyond the position shown in Fig. 37. As the box passes from the position B$^9$ and is operated on by the roller 177 and the brush 180 it will come to the position indicated at the top of Fig. 37.

On a rod 181 is located a small motor 182 which operates a brush 183. This brush is shown as of double conical shape and rotates in a direction as indicated by the arrow in Fig. 40 to brush down the edge of the last side or end on the bottom of the box. The rod 181 is not stationary like the other rods but is mounted to turn having a spring 184 for normally holding it yieldingly in a certain position. When the lever 71 is pushed up by the cam 70 during the oscillation of the frame 68, as shown in Fig. 8, for receiving the article B, it engages an arm 186 on the rod 181. This swings the rod in opposition to a spring 187 connected to a collar on the rod at one end and to a fixed point on the other. This swings the brush 183 back away from the box, as indicated in dotted lines in Fig. 40, so that it will not brush up the first edge of the paper turned over on the bottom of the box and thereby possibly rough up the bottom surface. This leaves the bottom of the box in the position shown in Fig. 41 with the paper lapping over slightly at the edge at 188.

The form and box have now passed through the position B$^9$ and over into the ejecting position B$^{10}$ and they are in the position shown in Fig. 42. On the disc 108 is a depression 189 and the roller 112 drops into this depression at this point. The result of this is that the spring 107 is now able to pull down the rod 114 and swing the arm 115 and the lever 116 inwardly. The end of this lever presses against a rod 190 and pushes it from the position shown in Fig. 19 in the hollow shaft 121 in which it is located. The end of this rod 190 is pivoted to two links 191 which in turn are pivoted to two levers 192, normally held back by springs 193. The pushing of this rod 190 inwardly operates the parts from the position shown in Fig. 42 to that shown in Fig. 44. On the ends of these levers 192 are ejector plates 197 which press against the bottom of the box, which heretofore was located on the open bottom of the form, and force the box off the form into the delivery chute 194. The box is thus completed and delivered.

In order to assist in the ejecting operation a blast of air can be introduced from a nozzle 195 through an opening 196 in the back of the form to loosen the upper end of the box from the form and insure its delivery over into the chute right side up. The bottom of the box as stated is shown in Fig. 41.

It will be noted that the paper projects beyond the open edge of the box at the point 198 all around. This machine does not finish this edge of the box but, as this paper is gummed on the inner side all around, it is a simple operation to turn down this edge on the inside of the box and finish the edge of the box. The corners where overlapping is necessary are easily fixed by the ordinary methods so as to lie smoothly in the box.

In operation the boxes are delivered on the feeding conveyer right side up and in longitudinal position but otherwise no special attention is paid to them. They are automatically and continuously delivered to the conveyer 53 and the stops 50 and 51 control and time their discharge from this conveyer when they move down into the hopper which is at that time located in inclined position. The conveyers mentioned are not a part of the wheel but the hopper is carried by the machine and is automatically closed on the box after it is received in the hopper. The open front of the box is pushed on a form, one of which is carried by each of the radial arms of the wheel, this form moving a quarter turn to bring the box around to a tangential position at the station B$^4$. Here the box receives its first contact with the paper with which it is to be covered. The paper is gummed on the inner surface and is brushed down along the first surface, which is one of the longitudinal surfaces, of the box when it passes from station B⁴ to station B⁵. At this latter station the paper is cut off so as to just lap over the end of the box and the web of paper is pulled along by the box thereafter, the paper being pasted to it along one side. The end of the web which is cut off beyond the edge of the box is stuck down on the box by a brush on one of the knife blades at this station. The box then continues to move around on the wheel to station B⁶ where the first one of the rolling longitudinal moving rollers passes over the bottom of the box to roll down the first, or advance, projecting edge of the paper to finish the corner of the first side of the box. This roll, as the box moves along under it, moves longitudinally so that its action is always a lateral pasting action on the small strip of paper upon which it operates. In this position the box and form pass to station B⁷ turning a quarter turn during that passage. This leaves the box in a radial position with its covered long surface forward. As the box passes from that position a long roller rolls down the overlapping edge on the bottom and this roller moves inwardly as the roll operates. As the box passes from this station forward, the end of the box is pasted down by a stationary brush. Next the form and box move along from station B⁷ and take two quarter turns, the first one indicated at B⁸ while the box is tangential again and another one of these movable rollers wipes down the projecting edge of the paper from the No. 2 side of the box on the bottom thereof. Also, in passing along, a vertically mounted roller presses the paper against the No. 3 side of the box, which is a longitudinal side. Then the box turns again and comes to the position B⁹ where the paper is pasted to the fourth side or end of the box by a stationary brush under which it passes and the fourth edge is pasted down on the bottom by the motor and the little brush carried thereby. The next step is for the form to move to the ejecting position B¹⁰ and the ejectors move automatically to throw the box off the form.

Thus the box is completed by a continuous rotation of the wheel, the box and paper always being in motion and the motion of the wheel being at a constant speed although, of course, the box turns on its own axis at certain times during the operation. This machine is capable of being constructed or adjusted to take care of boxes of all polygonal shapes and of a wide range of sizes.

It will be seen that this machine is entirely automatic. The boxes are fed in by mechanical means and taken from the conveyor and placed in the machine, properly timed, without any attention on the part of the operator. They are passed around through the various stations and discharged into a chute or conveyor entirely covered with paper and the paper laid down and pasted to the boxes everywhere except around the open edge, all without any attention on the part of the operator.

The machine can be adjusted for boxes of different sizes and obviously it can be used for covering articles other than shoe boxes and in fact any kind of an article and without changing the principle of the machine it can be constructed for covering articles of other shapes.

The covering paper is drawn through it continuously and it does not have to be stopped and started again and the same is true of the boxes which are carried around through a cycle, moving all the time and without any stopping of the machine. The chance of breakage or injury of the paper is practically eliminated by this continuous motion. Whenever we have referred to the various wiping devices as brushes, it will be understood that equivalents can be used such as rollers.

Although we have illustrated and described only one form of the invention we are aware of the fact that modifications can be made therein by any person skilled in the art without departing from the scope of the invention as expressed in the claims. Therefore we do not wish to be limited in this respect but what we do claim is:—

1. In a machine for covering articles with sheet material, the combination with a movable frame for carrying said articles throughout a prescribed course, of a feeding device compriisng a conveyer having a strand on which the articles are adapted to rest, and a timing device adapted to engage the inside of the rear end of each article and periodically release the forward article and simultaneously engage the next article to hold that article until time to feed it into the machine, said conveyor being located in position to discharge the article into proper position on said frame.

2. In a machine for covering articles with sheet material, the combination with a rotating frame, of a hand lever for starting the frame into operation, a conveyer for supporting the articles before they enter the rotating frame, a timing device associated with the conveyer and comprising a pivoted rod having stops at opposite ends adapted to be projected by the tilting of the rod into and out of two adjacent articles on the conveyer for releasing the articles, one at a time, the conveyer being arranged and adapted to discharge the released article in proper timing into the rotating frame, and means operated periodically and accurately by the machine for controlling the timing device.

3. In a machine for covering articles with sheet material, the combination of a rotating frame, means for rotating the frame, a shaft operable by the rotating means, a solenoid, a timing device for controlling the feeding of the articles into the frame, means actuated by the solenoid for operating the timing device, and means operated by said shaft for periodically energizing and deenergizing the solenoid.

4. In a machine for covering articles with sheet material, the combination with a rotary frame and means for rotating it, of an oscillatable shaft, means for oscillating the shaft, a frame mounted on the shaft to oscillate therewith about the axis of the shaft, a hopper carried by the last named frame and adapted to turn about an axis at right angles to said shaft, means for holding said hopper in an inclined position when about to receive an article therein, said frame being movable about the axis of the shaft when the shaft oscillates to an inclined position with respect to the article-receiving position thereof, and means for gripping the article in the hopper.

5. In a machine for covering articles with sheet material, the combination with a rotary frame for carrying the articles around in a predetermined path, of a second frame oscillatable on the axis of the rotary frame in synchronism therewith and in the same direction as its turns, a hopper adjustably mounted on the second frame and adapted to swing on an axis at right angles to the axis of oscillation of the second frame, and means whereby when the second frame swings from receiving to discharging position the bottom of the hopper will be moved inwardly to discharge the article therefrom.

6. In a machine for covering articles with sheet material, the combination with a rotary frame having forms thereon for receiving the articles to be covered, of a hopper for receiving the articles as they enter the machine, said hopper having movable sides and being movable laterally, means whereby when the hopper moves laterally the sides will come toward each other to clamp the article gently, the hopper having a movable bottom and an open top, means whereby when the hopper has moved laterally to limiting position, the bottom of the hopper will be moved outwardly between the sides to discharge the article from the hopper, and means whereby the form is located definitely in registration with the hopper to receive the article thereon from the hopper.

7. In a machine for covering articles with sheet material, the combination with a rotary frame for carrying the articles in the machine, of a second frame, means for oscillating the second frame on the same axis as that on which the first frame rotates, a stationary cam, a lever on the second frame, a slidable rod carried by the second frame and connected with the lever, said cam being so located as to move said rod longitudinally when the second frame swings from normal receiving position, a rack carried by, and movable with, the rod, a pinion meshing with the rack, a bracket carried by the second frame, a shaft for the pinion carried by the bracket, yielding means for turning the shaft backwardly, a frame pivotally mounted on the bracket, a hopper having a movable bottom and pivoted sides, adjustable means on the bracket for adjusting said pivoted sides to allow for articles of different widths, means connected with said shaft for moving the bottom through the hopper to discharge an article therefrom as the shaft moves, the movable sides having arms, a plate mounted in fixed position, and means connected with the shaft for moving the hopper back into article-receiving position, said plate being located in position to engage said arms and open the sides when the hopper is moved back to receiving position.

8. In a machine for covering articles with sheet material, the combination with a hopper having a movable bottom and pivoted sides, of a shaft, said hopper being connected with said shaft to swing with it, means for oscillating said shaft to a retracted position for receiving the articles therein, means for opening the sides of the hopper when it moves back to the said retracted position, an adjustable stop for engaging the hopper when it moves up to discharging position, and means connected with said shaft for moving the bottom of the hopper inwardly through the hopper when the hopper has moved to discharging position and engaged said stop.

9. In a machine for covering articles with sheet material, the combination with a hopper having a movable bottom, of a shaft, said hopper being connected with said shaft to swing with it, means for oscillating said shaft to a retracted position for receiving the articles in the hopper, a tube fixed with respect to the hopper, a slide in the tube to which the bottom of said hopper is fixed to move with it and a link motion connected with said shaft and adapted to operate the slide in the last named position to force an article out of the hopper.

10. In a machine for covering articles with sheet material, the combination of a rotary frame comprising a plurality of radially arranged arms, each arm having a transverse shaft thereon, a form on each shaft of the shape of the article to be covered for receiving the article thereon, means for forcing the article on said form, a stationary disc about which the frame rotates, each arm being provided with a Geneva wheel, said disc having means for turning said Geneva wheels at a plurality of points during the rotation of the frame, means connected with each Geneva wheel for turning the transverse shaft on the corresponding arm a part of a revolution, the disc having means for holding all the Geneva wheels stationary at all other times.

11. In a machine for covering articles with sheet material, the combination with a rotary frame having a series of radial arms and a transverse shaft on each arm having an article-receiving form fixed thereto and provided with an indexing disc having notches, of an indexing pin on each arm adapted to engage in these notches one after the other to hold the form in definite positions, a stationary disc on the axis of said frame, said disc and arms having means for rotating the form a part of a revolution at a time, said disc having a fixed cam, a rod on each arm, means operated by the cam for reciprocating said rod, and a lever connected with said rod and with said indexing pin to withdraw it at stated intervals for the purpose of allowing the form to be turned.

12. In a machine for covering articles with sheet material, the combination with a rotary sleeve and means for rotating it constantly, a stationary sleeve thereon on which the first named sleeve rotates and a shaft within the stationary sleeve, of means operated by the first-named sleeve for oscillating said shaft, a frame for supporting an article to be covered secured to the shaft, a plurality of radial arms centered on the shaft and sleeves, said arms being fixed to the sleeve to turn therewith, and means connected with said arms for controlling certain operations of covering the article.

13. In a machine for covering articles with sheet material, the combination of a rotary frame having arms radiating from the center, transverse shafts on said arms, forms mounted on said shafts for supporting the article to be covered, and means for turning said forms part of a turn at a time during certain periods of the rotation of the frame for presenting said article in different positions to enable the different sides thereof to be covered with a sheet material in a single continuous operation.

14. In a machine for covering articles with sheet material, the combination of a rotary frame having arms extending radially and a series of forms rotatably mounted on said arms on axes parallel with the axis of rotation, means for rotating the frame constantly, means for leading a previously gummed web of material against the outer surface of an article on one of the forms, means for wiping down the material on the surface of the article which it engages, means for cutting off the web into sheets long enough to cover the articles, means connected with the cutting means for wiping down an end of the sheet on the advance end of the article, means for thereafter turning the form a quarter of a revolution, thereby bringing the sheet into contact with the second side or end of the article, stationary means for wiping down the last named portion of the sheet as the article passes said means, means for then turning the form another quarter revolution during the next step in the rotation of the frame, means for engaging the article while in this position to wipe down the sheet on the third side of the article, means for turning the article and its form through another quarter revolution, and means for wiping down the sheet on the fourth side of the article after it is turned through this last quarter turn.

15. In a machine for covering articles with sheet material, the combination with a frame and means for constantly rotating it, of a series of forms on said frame for holding the articles to be covered, said forms being rotatable on their axes, means for guiding a previously gummed covering web, means for cutting off the web into sheets of the proper length at a certain stage in the rotation of the frame, means for turning the form through a part of a turn at a time to wind a sheet as produced around the article, said web being so located that the edge projects beyond the bottom of the article, a shaft in stationary position, a helically grooved shaft movable longitudinally and radially on the shaft, a soft surfaced roller fixedly secured to the latter shaft, means for engaging the helically grooved shaft to cause it to move longitudinally along the shaft when it rotates by friction of the roll on the bottom of the article to be covered, and means for yieldingly holding the roller against the bottom of said article to wipe down one of said projecting edges.

16. In a machine of the character described, the combination with a rotatable frame and means for rotating the frame constantly and uniformly, of means for automatically feeding the articles into the frame, a hopper for receiving the articles, rotatable means on the frame for receiving the articles from the hopper, means for rotating said means automatically by a step by step motion to wind a sheet of gummed material all around each article, and means for automatically discharging each article from the machine.

17. In a machine of the character described, the combination with a rotatable frame and means for rotating the frame constantly and uniformly, of means for automatically feeding the articles into the frame, a hopper for receiving the articles, rotatable means on the frame for receiving the articles from the hopper, means for rotating said means automatically by a step by step motion to wind a sheet of gummed material all around each article, means for automatically wiping down the sheet on each side of the article, and means for automatically discharging each article from the machine.

18. In a machine for covering articles with sheet material, the combination with a rotary frame and means for rotating it constantly at constant speed, of a plurality of means on the frame for receiving the articles to be covered, means for attaching the end of a gummed web to an article on the machine, means for automatically cutting off the web to the proper length, means for turning the articles one by one when they get to certain points to wind the sheet around them, and means whereby after the entire covering operation is completed each article is automatically ejected from the machine.

19. In a machine for covering articles with sheet material, the combination with a rotary frame and means for rotating it constantly at constant speed, of a plurality of means on the frame for receiving the articles to be covered, means for attaching the end of a gummed web to an article on the machine, means for automatically cutting off the web to the proper length, means for turning the articles one by one when they get to certain points to wind the sheet around them, means for forcing down the sheet against the sides of the article, one by one, the web being guided into the machine in such a way as to project beyond the top and bottom sides of the article, means for laying down the projecting edges on the bottom of the article and forcing them against the bottom, one by one, and means whereby after the entire covering operation is completed each article is automatically ejected from the machine.

20. In a machine for covering an article with sheet material, the combination with a rotary frame and means for rotating it constantly, of means for leading a web of material into the machine, means for automatically wrapping the sheets of this material around the articles, means for pasting the material on the article, a series of forms carried by the frame, each form having an open side, the articles being applied on the said open side, an ejector in each form comprising arms adapted to be unfolded and pushed against the bottom of the article to release it from the form, and means for automatically operating the ejector.

21. In a machine of the character described, the combination with a movable frame and a stationary disc having a cam surface, of forms carried by the frame, a shaft on which each form is mounted, means operated by the disc for rotating each shaft intermittently a part of a revolution at a time, a lazy tongs structure in each form for ejecting the box, a rod operating the lazy tongs, passing through said shaft, and means operated by the stationary disc for pushing in said rod to actuate the ejector.

22. In a machine of the character described, the combination of a rotary frame and a stationary disc, said disc having a projecting cam surface and a depressed cam surface, a form on the frame, a shaft carrying the form, means operated by the projecting cam surface for releasing the form so that it can be rotated, means for rotating the form, a rod passing through said shaft, an ejector in the form connected with said rod to be operated thereby to eject the article from the form, and means connected with the first named means to be operated by said depressed cam surface for operating said rod to project the ejector.

23. In a machine for covering articles with sheet material, the combination with means for holding an article in position for a sheet of the material to engage it, of a differential gear, a shaft and sleeve operated by the differential gear in opposite directions, means for moving the shaft and sleeve, a cutter blade mounted on a sleeve, another cutter blade on the shaft, one of said cutter blades being capable of moving laterally, a cam on the sleeve, and means on the movable cutter blade for engaging the cam and holding the blade out of cutting position until after the blades have moved to a position in which the edge of one is over the edge of the other.

24. In a machine for covering articles with sheet material, the combination of a rotatable frame carrying the article, means associated with said frame for turning the articles on their axes as they move with the frame to wind a sheet of material around them, the sheet of material being so placed as to project beyond the bottom of the article, means for laying down the projecting edges of the sheet along three sides of the article, a rod oscillatably supported, a motor carried by the rod, a brush on the motor shaft for engaging the last edge of the material and laying it down on the bottom of the article, a hopper on the frame, a lever for operating the hopper, and means projecting from said rod in position to be engaged by said lever, when the lever moves to move the hopper, for turning the rod so that the brush will move out of engagement with the article to be covered.

25. In a machine for covering articles with sheet material, the combination of a rotatable frame carrying the article, means associated with said frame for turning the article on an axis as they move with the frame to wind a sheet of material around it, the sheet of material being so placed as to project beyond the bottom of the article, means for laying down the projecting edges of the sheet along a plurality of sides of the article, a rod oscillatably supported, a motor carried by the rod, and a brush on the motor shaft for engaging the last edge of the material and laying it down on the bottom of the article.

26. In a machine for covering articles with sheet material, the combination with a frame and means for constantly rotating it, of a series of forms on said frame for holding the articles to be covered, said forms being rotatable on their axes, means for guiding a previously gummed covering web, means for cutting off the web into sheets of the proper length at a certain stage in the rotation of the frame, means for turning the form through a part of a turn at a time to wind a sheet as produced around the article, said web being so located that the edge projects beyond the bottom of the article, and means for wiping down one of said projecting edges on the bottom of the article.

27. In a machine for covering articles with sheet material, the combination of means for carrying the article, means for turning the article on an axis to wind a sheet of material around it, the sheet of material being so placed as to project beyond the bottom of the article, a rod oscillatably supported, a motor carried by the rod, and a brush on the motor shaft for engaging the last edge of the material and laying it down on the bottom of the article.

28. In a machine for covering articles with sheet material, the combination of means for carrying the article, means for turning the articles on their axes to wind a sheet of material around them, the sheet of material being so placed as to project beyond the bottom of the article, a rod oscillatably supported, a motor carried by the rod, a brush on the motor shaft for engaging the last edge of the material and laying it down on the bottom of the article, a hopper, a lever for operating the hopper, and means projecting from said rod in position to be engaged by said lever when the lever moves to move the hopper, for turning the rod so that the brush will move out of engagement with the article to be covered.

29. In a machine for covering articles with sheet material, the combination with means for holding an article in position for a sheet of the material to engage it, of a shaft and sleeve, means for turning the shaft and sleeve in opposite directions, a cutter blade mounted on a sleeve, another cutter blade on the shaft, one of said cutter blades being capable of moving laterally, a cam connected with the sleeve, and means connected with the movable cutter blade for engaging the cam and holding the blade out of cutting position until after the blades have moved to a position in which the edge of one is over the edge of the other.

30. In a machine of the character described, the combination of a frame, a stationary projecting cam surface, a depressed cam surface, a rotatable form on the frame for receiving the article, a shaft carrying the form, means operated by the projecting cam surface for releasing the form so that it can be rotated, means for rotating the form, a rod, an ejector in the form connected with said rod to be operated thereby to eject the article from the form, and means connected with the first named means to be operated by said depressed cam surface for operating said rod to project the ejector.

31. In a machine for covering articles with sheet material, the combination with a frame, of a series of forms on said frame for holding the articles to be covered, said forms being rotatable on their axes, means for turning the form through a part of a turn at a time to wind a sheet around the article, said web being so located that the edge projects beyond the bottom of the article, a shaft in stationary position, a helically grooved shaft movable longitudinally and radially on the shaft, a soft surfaced roller fixedly secured to the latter shaft, means for engaging the helically grooved shaft to cause it to move longitudinally along the shaft when it rotates by friction of the roll on the bottom of the article to be covered, and means for yieldingly holding the roller against the bottom of said article to wipe down one of said projecting edges.

32. In a machine for covering articles with sheet material, the combination of a frame having arms and a series of forms rotatably mounted on said arms, means for rotating the frame, means for leading a previously gummed web of material against the outer surface of an article on one of the forms, means for wiping down an end of the sheet on the advance end of the article, means for thereafter turning the form a quarter of a revolution, thereby bringing the sheet into contact with the second side or end of the article, stationary means for wiping down the last named portion of the sheet as the article passes said means, means for then turning the form another quarter revolution, means for engaging the article while in this position to wipe down the sheet on the third side of the article, means for turning the article and its form through another quarter revolution, and means for wiping down the sheet on the fourth side of the article after it is turned through this last quarter turn.

33. In a machine for covering articles with sheet material, the combination with a frame having arms and a shaft on each arm having an article-receiving form fixed thereto and provided with an indexing disc having notches, of an indexing pin adapted to engage in these notches one after the other to hold the form in definite positions, a stationary disc, said disc and arms having means for rotating the form a part of a revolution at a time, said disc having a fixed cam, a rod on each arm, means operated by the cam for reciprocating said rod, and a lever connected with said rod and with said indexing pin to withdraw it at stated intervals for the purpose of allowing the form to be turned.

34. In a machine for covering articles with sheet material, the combination with a hopper having a movable bottom and sides, of a shaft, said hopper being connected with said shaft to swing with it, means for oscillating said shaft to a retracted position for receiving the articles therein, means for opening the sides of the hopper when it moves back to the said retracted position, and means connected with said shaft for moving the bottom of the hopper inwardly through the hopper when the hopper has moved to discharging position.

35. In a machine for covering articles with sheet material, the combination of a hopper for receiving the articles, said hopper having movable sides and being movable laterally, means whereby when the hopper moves laterally the sides will come toward each other to clamp the article, the hopper having a movable bottom and an open top, and means whereby when the hopper has moved laterally to limiting position, the bottom of the hopper will be moved outwardly between the sides to discharge the article from the hopper.

DE WITT TOWER.
RAYMOND C. TOWER.